US011587453B2

(12) United States Patent
Baker et al.

(10) Patent No.: US 11,587,453 B2
(45) Date of Patent: Feb. 21, 2023

(54) SYSTEMS AND METHODS FOR GUIDED INSTRUCTIONAL DESIGN IN ELECTRONIC LEARNING SYSTEMS

(76) Inventors: John Allan Baker, Waterloo (CA);
Kenneth Chapman, Kitchener (CA);
Benjamin Craig, Beechwood (CA);
Stephen Downes, Moncton (CA);
Guillaume Durand, Ammon (CA);
Rodrigue Savoie, Dieppe (CA); Danny Cormier, Dieppe (CA); Dany Benoit, Dieppe (CA); Luc Belliveau, Riverview (CA); Jeremy Jason Auger, Breslau (CA); Brian John Cepuran, Oakville (CA); Ali Ghassemi, Waterloo (CA);
Dimitrije Jankovic, Kitchener (CA);
Norman Daoust, Vancouver (CA);
Gregory Beckman, Kitchener (CA)

( * ) Notice: Subject to any disclaimer, the term of this patent is extended or adjusted under 35 U.S.C. 154(b) by 908 days.

(21) Appl. No.: 13/183,862

(22) Filed: Jul. 15, 2011

(65) Prior Publication Data

US 2012/0149000 A1 Jun. 14, 2012

Related U.S. Application Data

(63) Continuation of application No. 12/958,290, filed on Dec. 1, 2010, now abandoned.

(60) Provisional application No. 61/293,081, filed on Jan. 7, 2010.

(51) Int. Cl.
G09B 7/00 (2006.01)

(52) U.S. Cl.
CPC ..................... G09B 7/00 (2013.01)

(58) Field of Classification Search
CPC .......................................................... G09B 7/04

USPC ........................................................... 434/362
See application file for complete search history.

(56) References Cited

U.S. PATENT DOCUMENTS

| 5,987,247 | A | * | 11/1999 | Lau ............................... 717/100 |
| 6,606,480 | B1 | * | 8/2003 | L'Allier ................... G09B 7/02 434/219 |
| 6,622,003 | B1 | * | 9/2003 | Denious et al. ............. 434/350 |
| 6,988,239 | B2 | * | 1/2006 | Womble ................... G09B 7/02 434/323 |

(Continued)

OTHER PUBLICATIONS

Rob Kelly et al., Online Course Design: 13 Strategies for Teaching in a Web-based Distance Learning Environment Faculty Focus, available as early as Feb. 24, 2009.

*Primary Examiner* — Robert J Utama
(74) *Attorney, Agent, or Firm* — Bereskin & Parr LLP

(57) ABSTRACT

According to some embodiments, a system for providing guided instructional design. The system includes at least one processing device and at least one data storage device in communication with the at least one processing device. The at least one data storage device is configured to store information about at least one course. For each course, the at least one processing device is configured to present at least one predetermined course component to a first user, and for the at least one course component: present at least one course parameter, receive at least one first input from the first user in relation to the at least one course parameter, based on the at least one first input and at least one educational design element, present at least one modified course parameter to the first user; and receive at least one second input from the first user in relation to the at least one modified course parameter.

23 Claims, 39 Drawing Sheets

(56) References Cited

U.S. PATENT DOCUMENTS

| | | | | |
|---|---|---|---|---|
| 7,014,467 B2* | 3/2006 | Krebs | ............... | G09B 5/00 |
| | | | | 434/118 |
| 7,029,280 B2* | 4/2006 | Krebs | ............... | G09B 5/00 |
| | | | | 434/118 |
| 7,328,224 B2 | 2/2008 | Kawamoto et al. | | |
| 7,337,166 B2 | 2/2008 | Bailey et al. | | |
| 7,912,696 B1* | 3/2011 | Asano et al. | ............... | 704/2 |
| 2002/0052860 A1* | 5/2002 | Geshwind | ............... | G09B 7/02 |
| | | | | 706/62 |
| 2002/0107681 A1* | 8/2002 | Goodkovsky | ............ | G09B 7/04 |
| | | | | 703/22 |
| 2002/0142278 A1* | 10/2002 | Whitehurst | ............ | G09B 7/04 |
| | | | | 434/350 |
| 2002/0169822 A1* | 11/2002 | Packard | ............... | G09B 7/00 |
| | | | | 709/203 |
| 2004/0002039 A1* | 1/2004 | Draper | ............... | G09B 7/04 |
| | | | | 434/118 |
| 2005/0026130 A1* | 2/2005 | Crowhurst | ............ | G09B 5/06 |
| | | | | 434/362 |
| 2006/0008789 A1* | 1/2006 | Gerteis | ............... | G09B 5/00 |
| | | | | 434/81 |
| 2007/0099161 A1* | 5/2007 | Krebs | ............... | G09B 5/00 |
| | | | | 434/322 |
| 2007/0195081 A1* | 8/2007 | Fischer | ............... | G06T 11/60 |
| | | | | 345/418 |
| 2009/0017436 A1* | 1/2009 | Sumrall | ............... | G09B 7/02 |
| | | | | 434/433 |

* cited by examiner

FIG. 13

Select Grading System

Select the grading system for Nam liber tempor cum soluta nobis eleifend option congue nihil imperdiet doming id quod mazim placerat facer possim assum ○ Points
Example:
Assignments Category (40 points)
   Assignment 1 Item (20 points)
   Assignment 2 Item (20 points)
Final Exam Item (200 points)

Final Grade:/240 points

☐ Use a formula for the final grade
Claritas est etiam processus dynamicus, qui sequitur mutationem consuetudium ○ Weighted
Example:
Assignments Category (20% of final grade)
   Assignment 1 Item (50% of category)
   Assignmnet 2 Item (50% of category)
Final Exam Item (80% of final grade)

Final Grade:/100%

[1] Define Learning Goals »
[2] Choose Learning Activities »
[3] Create Learning Segments »
[4] Configure Assessment
  * Select Grading System
  * Create Test Schedule
  * Categorize Grades
  * Assign Weights

[Exit] [Back] [Next] [Save & Exit Wizard]

x% complete

FIG. 14

Course Design Wizard is Complete

The following actions were taken... Nam eget augue risus, eget dictum diam. Vestibulum id nisi nibh. Suspendisse nec turpis faucibus metus luctus ultrices.

* Modules and placeholders were created in your content...
* Sem leo elementum odio
* Id posuere nisl tortor nec erat Cleik "finish" to exit the wizard.

[ Finish ]

Course Creation Wizard - Step 4 of 9

| 1.0 Course Info | 2.0 Goals | 3.0 Context | 4.0 Objectives | 5. Assessment | 6. Strategy | 7. Materials | 8. Review | 9. Finish |

4.0 Learning Objectives

Course Learning Objectives

Identify objectives for the course, including performance skills, behavioral objectives, performance objectives, and knowledge development objectives. Having well defined objectives will help inform course participants of what they are expected to learn. It will also help guide instructors teaching the course.

Course Learning Objectives: [Add Learning Objectives]

- List and explain the steps involved in Meiosis
- Recognize and identify basic laboratory equipment
- Perform basic biology laboratory experiments
- Classify plant and animal species
- Describe the ecological role of plants
- Describe the role of photosynthetic organisms in the evolution of the atmosphere
- Describe the ecological role of fungi

[Cancel] [Save & Exit Wizard]  [Previous] [Next]

Course Creation Wizard - Step 6 of 9   Biology 1001   Save & Exit Wizard

| 1.0 Course Info | 2.0 Goals | 3.0 Context | 4.0 Objectives | 5.0 Assessment | 6.0 Strategy | 7. Materials | 8. Review | 9. Finish |

6.1 Structure | 6.2 Sequencing | 6.3 Components

6.0 Course Strategy
6.2 Course Sequencing

Course Sequencing

Please select how you would like to divide and sequence the units of instruction for your course. How do I choose my course sequence?

\* What type of sequencing would you like to use for the course?

- ⦿ On a timeline *(Recommended)*
  Examples: month, week, days, etc.
- ○ By subject matter
  Examples: units, modules, topics, etc.
- ○ By competencies and learning objectives
  Examples: reading comprehension, lab work, objectives, etc.

What units would you like to use for your sequencing?

\* Course Units: [Weeks ▾]

\* Number of Units: [10] weeks

[Cancel]  [Save & Exit Wizard]    [Previous] [Next]

SYSTEMS AND METHODS FOR GUIDED INSTRUCTIONAL DESIGN IN ELECTRONIC LEARNING SYSTEMS

RELATED APPLICATIONS

This application is a continuation of U.S. patent application Ser. No. 12/958,290 filed Dec. 1, 2010 and entitled SYSTEMS AND METHODS FOR GUIDED INSTRUCTIONAL DESIGN IN ELECTRONIC LEARNING SYSTEMS, the entire contents of which are hereby incorporated by reference herein for all purposes, and which claims the benefit of U.S. Provisional Application Ser. No. 61/293,081, filed Jan. 7, 2010, and entitled SYSTEMS AND METHODS FOR GUIDED INSTRUCTIONAL DESIGN IN ELECTRONIC LEARNING SYSTEMS, the entire contents of which are hereby incorporated by reference herein for all purposes.

FIELD

The embodiments described herein relate to electronic learning, and more particularly to systems and methods for providing guided instructional design for electronic learning systems.

INTRODUCTION

Electronic learning (also called e-Learning or eLearning) generally refers to learning where users engage in education related activities using computers and other computer devices. For examples, users may enroll or participate in a course or program of study offered by an educational institution (e.g. a college, university or grade school) through a web interface that is accessible over the Internet. Similarly, users may receive assignments electronically, participate in group work and projects by collaborating online, and be graded based on assignments and examinations that are submitted using an electronic dropbox or other similar service.

Electronic learning is not limited to use by educational institutions, however, and may also be used in governments or in corporate environments. For example, employees at a regional branch office of a particular company may use electronic learning to participate in a training course offered by another office without ever physically leaving their office.

In most electronic learning systems, some users are consumers and will participate in courses (e.g. by listening or watching lectures, conducting assignments, and taking quizzes, etc.) while other users are providers who are responsible for preparing the course framework, including the course structure and/or materials (e.g. determining what topics are to be covered in a particular course, what assignments will be required, how performance is to be assessed, etc.).

However, planning the framework of courses (e.g. selecting the course structure, organizing lecture materials, etc.) can be a difficult exercise. This is true generally with all forms of learning, but is particularly problematic in electronic learning systems.

For example, in a traditional course setting, it may be sufficient to prepare materials as the course is taught (e.g. a "just-in-time" approach) since the course normally follows a particular sequence and timeline. However, in electronic learning systems some users may be progressing through the course content at different rates of speed, or may review educational modules in different orders depending on particular interests. Accordingly, it may be helpful if the entire course structure and materials is determined before any teaching of the course begins.

Many users lack the skills and training to properly prepare courses. In particular, users may not be familiar with the design or creation of electronic learning courses, and may be intimidated by concepts related to designing content and thus have difficulty in providing a course in an electronic learning system.

Accordingly, the inventors have developed systems and methods for guided instructional design with a view towards addressing at least some of these challenges.

SUMMARY

According to one embodiment, there is provided a system for providing guided instructional design, comprising: at least one processing device; and at least one data storage device in communication with the at least one processing device, the at least one data storage device configured to store information about at least one course; wherein, for each course, the at least one processing device is configured to present at least one predetermined course component to a first user, and for the at least one course component: present at least one course parameter; receive at least one first input from the first user in relation to the at least one course parameter; based on the at least one first input and at least one educational design element, present at least one modified course parameter to the first user; and receive at least one second input from the first user in relation to the at least one modified course parameter.

At least one of the course parameters may include at least one natural language object. At least one natural language object may include at least one predefined educational term. At least one of the course parameters may include at least one control associated with the at least one natural language object, each control for receiving one of the at least one first inputs.

In some embodiments, the presenting of the at least one modified course parameter to the first user includes suggesting at least one course structure element.

The educational design element may include at least one element of educational theory.

In some embodiments, the at least one processing device is further configured to generate a customized course framework for that particular course based on the at least one first input, the at least one second input and the at least one educational theory element.

In some embodiments, the system further comprises at least one computing device in communication with the at least one processing device, wherein the at least one processing device is further configured to: receive at least one request from a second user in relation to a particular course, and in response to the request, present at least part of the course framework for that course to the second user using one of the computing devices.

At least one of the course parameters and modified course parameters may be related to course competencies.

At least one of the course parameters and modified course parameters may be related to course objectives, each objective associated with at least one course competencies.

At least one of the course parameters and modified course parameters may be related to at least one course activity, each activity associated with at least one course objective.

At least one of the course parameters and modified course parameters may be related to course information.

At least one of the course parameters and modified course parameters may be related to at least one educational module.

At least one of the course parameters and modified course parameters may be related to at least one assessment for the at least one educational module.

At least one of the first inputs and second inputs may include educational materials associated with the at least one educational modules.

The educational materials may include at least one data file. The at least one data file may include a media file.

In some embodiments, at least one of the course parameters and modified course parameters include predetermined natural language objects.

In some embodiments, at least one of the modified course parameters includes natural language objects selected based on the at least one first input.

The at least one processing device may be further configured to present the customized course framework to the first user and allow the first user to edit the course framework.

In some embodiments, at least one of the course parameters and modified course parameters may be determined based on historical course information.

According to yet another embodiment, there is provided a tangible computer readable medium including computer executable instructions which, when executed on a computing device, cause the computing device to: present at least one predetermined course component to a first user; and for at least one course component: present at least one course parameter; receive at least one first input from the first user in relation to the at least one course parameter; based on the at least one first input and at least one educational design element, present at least one modified course parameter to the first user; and receive at least one second input from the first user in relation to the at least one modified course parameter.

In some embodiments, the computer readable medium is non-transitory.

According to yet another embodiment, there is provided a method for providing guided instructional design, comprising: providing at least one processing device; and providing at least one data storage device in communication with the at least one processing device, the at least one data storage device configured to store information about at least one course; presenting at least one predetermined course component to a first user, and for the at least one course component: presenting at least one course parameter; receiving at least one first input from the first user in relation to the at least one course parameter; based on the at least one first input and at least one educational design element, presenting at least one modified course parameter to the first user; and receiving at least one second input from the first user in relation to the at least one modified course parameter.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 13 is a screenshot of a course sequence page for the course design module of FIG. 3;

FIG. 14 is a screenshot of a select grading system page for the course design module of FIG. 3;

FIG. 18 is a screenshot of a completion page for the course design module of FIG. 3;

FIG. 19 is a screenshot of a course info page for a course design module in a system for providing guided instructional design according to another embodiment;

FIG. 20 is a screenshot of an instructor info page for the course design module of FIG. 19;

FIG. 21 is a screenshot of a course duration page for the course design module of FIG. 19;

FIG. 22 is a screenshot of a course sharing page for the course design module of FIG. 19;

FIG. 24 is a screenshot of a course competencies page for the course design module of FIG. 19;

FIG. 26 is a screenshot of an instructional setting page for the course design module of FIG. 19;

FIG. 27 is a screenshot of a learning objectives page for the course design module of FIG. 19;

FIG. 28 is a screenshot of a course assessment page for the course design module of FIG. 19;

FIG. 30 is a screenshot of a course sequence page for the course design module of FIG. 19;

FIG. 31 is a screenshot of a course components page for the course design module of FIG. 19;

FIG. 34 is a screenshot of a course review page for the course design module of FIG. 19;

DETAILED DESCRIPTION

Figure 1:
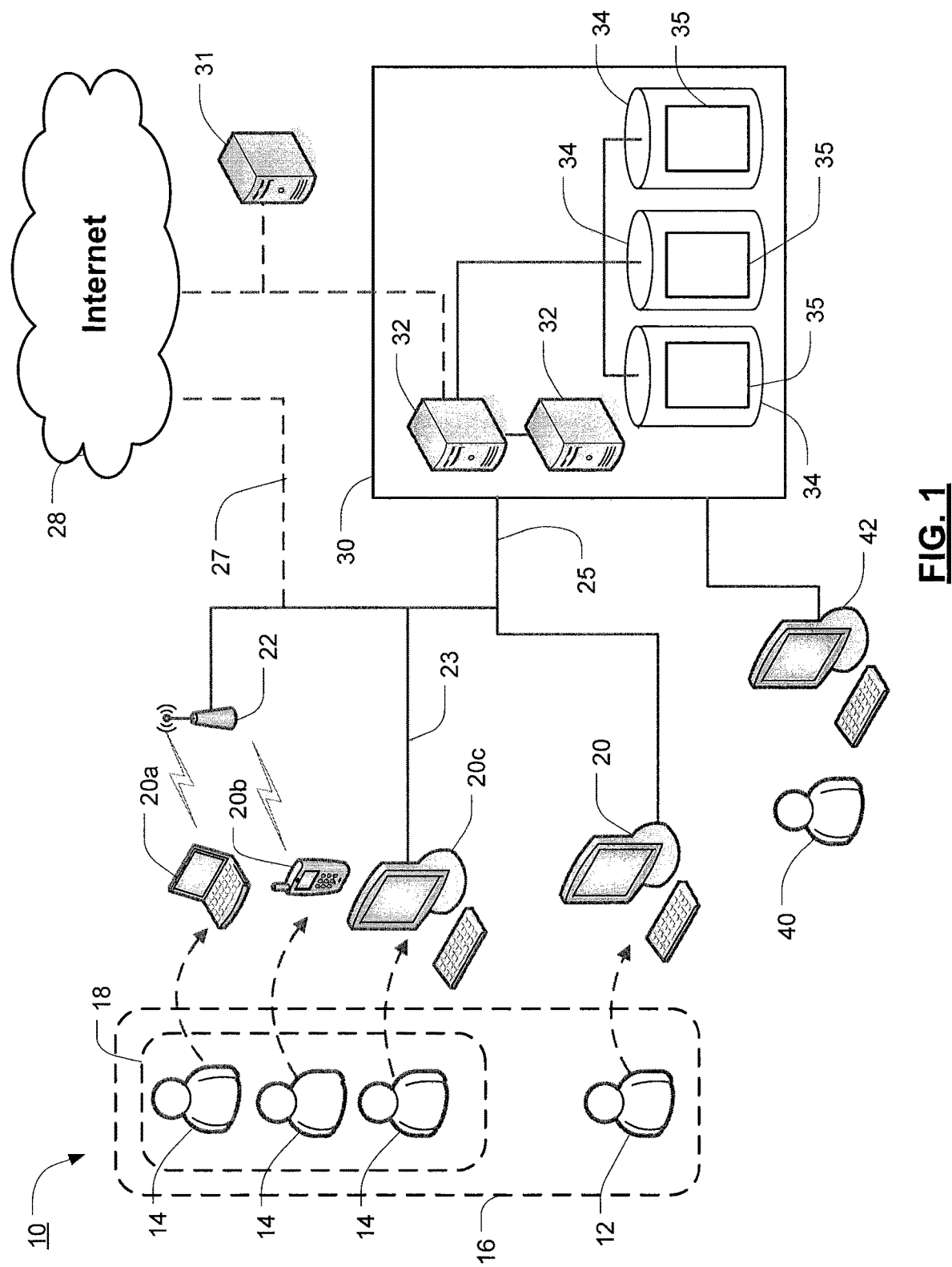
FIG. 1 is a block diagram illustrating a system for providing guided instructional design according to one embodiment.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. For example, some embodiments may be implemented in computer systems and computer programs, which may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard or mouse), and at least one output device (e.g. a display screen, a network, or a remote server). For example and without limitation, the programmable computers may include servers, personal computers, laptops, netbook computers, personal data assistants (PDA), cell phones, smart phones, gaming devices, and other mobile devices.

In some embodiments, program code can be applied to input data to perform the functions described herein and to generate output information. The output information can then be supplied to one or more output devices for outputting to one or more users.

Turning now to FIG. 1, illustrated therein is a system 10 for providing guided instructional design according to one embodiment.

Using the system 10, one or more users 12, 14 may communicate with an educational service provider 30 to participate in, create, and consume electronic learning services, including courses. In some cases, the service provider 30 may be part of or associated with a traditional "bricks and mortar" educational institution (e.g. a grade school, university or college), another entity that provides educational services (e.g. an online university, a company that specializes in offering training courses, or an organization that has a training department), or may be an independent service provider (e.g. for providing individual electronic learning).

In some embodiments, one or more educational groups can be defined that includes one or more of the users 12, 14. For example, as shown in FIG. 1, the users 12, 14 may be grouped together in an educational group 16 representative of a particular course (e.g. History 101, French 254), with a first user 12 being responsible for providing the course (e.g. organizing lectures, preparing assignments, etc), while the other users 14 are consumers of the course content (e.g. users 14 are enrolled in the course).

In some examples, the users 12, 14 may be associated with more than one educational group (e.g. the users 14 may be enrolled in more than one course, or the first user 12 may be responsible for teaching two or more courses).

In some cases, educational sub-groups may also be formed. For example, two of the users 14 are shown as part of educational sub-group 18. The sub-group 18 may be formed in relation to a particular project or assignment (e.g. sub-group 18 may be a lab group) or based on other criteria. In some embodiments, due to the nature of the electronic learning, the users 14 in a particular sub-group 18 need not physically meet, but may collaborate together using various tools provided by the educational service provider 30.

In some embodiments, other groups 16 and sub-groups 18 could include users 14 that share common interests (e.g. interests in a particular sport), that participate in common activities (e.g. users that are members of a choir or a club), and/or have similar attributes (e.g. users that are male, users under twenty-one years of age, etc.).

Communication between the users 12, 14 and the educational service provider 30 can occur either directly or indirectly using any suitable computing device. For example, the user 12 may use a computing device 20 such as a desktop computer that has at least one input device (e.g. a keyboard and a mouse) and at least one output device (e.g. a display screen and speakers).

The computing device 20 can generally be any suitable device for facilitating communication between the users 12, 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, or a terminal 20c over a wired connection 23.

The computing devices 20 may be connected to the service provider 30 via any suitable communications channel. For example, the computing devices 20 may communicate to the educational service provider 30 over a local area network (LAN) or intranet, or using an external network (e.g. by using a browser on the computing device 20 to browse to one or more web pages presented over the Internet 28 over a data connection 27).

In some examples, one or more of the users 12, 14 may be required to authenticate their identities in order to communicate with the educational service provider 30. For example, the users 12, 14 may be required to input a login name and/or a password to gain access to the system 10.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g. a course page).

The educational service provider 30 generally includes a number of functional components for facilitating the provision of social electronic learning services. For example, the educational service provider 30 generally includes one or more processing devices 32 (e.g. servers), each having one or more processors. The processing devices 32 are configured to send information (e.g. HTML) to be displayed on one or more computing devices 20 in association with the social electronic learning system 10 (e.g. course information). In some embodiments, a processing device 32 may be a computing device 20 (e.g. a laptop or personal computer).

The educational service provider 30 also generally includes one or more data storage devices 34 (e.g. memory, etc.) that are in communication with the processing devices 32, and could include a relational database (such as a SQL database), or other suitable data storage devices. The data storage devices 34 are configured to host data 35 about the courses offered by the service provider (e.g. the course frameworks, educational materials to be consumed by the users 14, records of assessments done by users 14, etc.) as will be described below.

The data storage devices 34 may also store authorization criteria that define what actions may be taken by the users 12, 14. The authorization criteria may include at least one security profile associated with at least one role. For example, one role could be defined for users who are primarily responsible for teaching or assessing work product from other users. Users with such a role may have a security profile that allows them to configure course frameworks, post assignments, add assessments, and evaluate performance.

In some embodiments, some of the authorization criteria may be defined by specific users 40 who may or may not be part of the educational community 16. For example, users 40 may be permitted to administer and/or define global configuration profiles for the system 10, define roles within the system 10, set security profiles associated with the roles, and assign the roles to particular users 12, 14 in the system 10. In some cases, the users 40 may use another computing device 42 (e.g. a desktop computer) to accomplish these tasks.

The data storage devices 34 may also be configured to store other information, such as personal information about the users 12, 14 of the system 10, information about which courses the users 14 are enrolled in, roles to which the users 12, 14 are assigned, particular interests of the users 12, 14 and so on.

The processing devices 32 and data storage devices 34 may also provide other electronic learning management tools (e.g. allowing users to add and drop courses, communicate with other users using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g. to prevent undesired data loss in the event of an event such as a fire, flooding, or theft).

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

Figure 2:
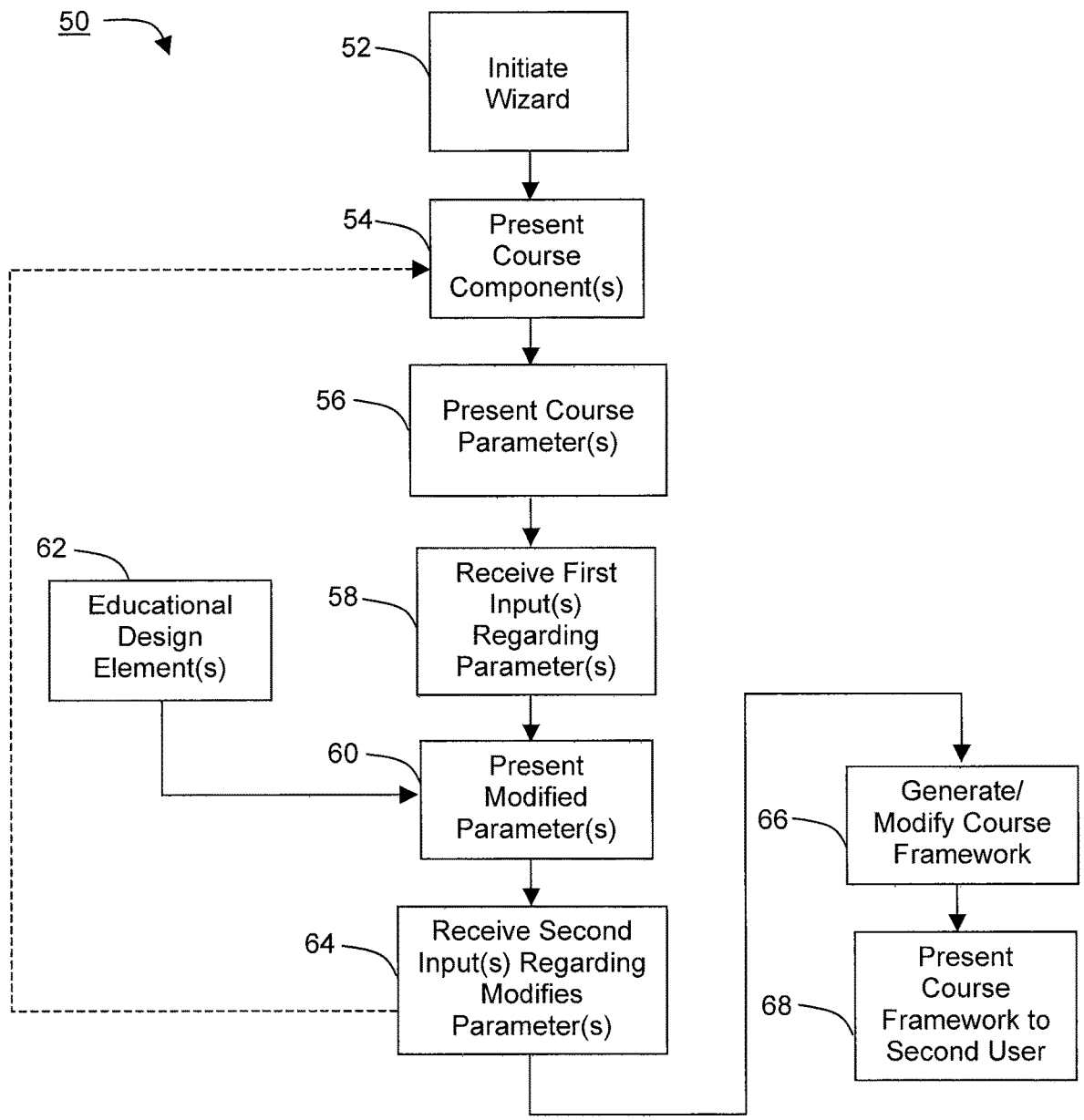
FIG. 2 is a flowchart showing a method for providing guided instructional design according to one embodiment.

Turning now to FIG. 2, illustrated therein is a method 50 of providing guided instructional design according to one embodiment. For example, in some cases, the method 50 may be provided using the system of FIG. 1.

At step 52, a first user (e.g. a user 12) desiring to generate a course will activate a course design module (e.g. a course wizard or module, such as the modules 100 and 200 described below). Generally the course design module will be operating on one or more processing devices, which could be a server (e.g. server 32) as well as computing devices 20.

At step 54, the course design module presents the user with one or more course components. Course components are generally broad "functions" that describe the various aspects of the course within the framework that can be configured, such as course information, competencies, course goals, assessments, materials, etc. In some cases, the course components can be considered as including broad components (e.g. course info) and narrower sub-components (e.g. basic course information, instructor info, course duration, etc.) that fall under the heading of a broader course component.

At step 56, for each course parameter is presented for each course component. Course parameters are individual educational elements within the course components, and can include natural language objects and controls, as will be described in greater detail below.

At step 58, the course design module receives at least one first input in relation to at least one of the course parameters from a first user (e.g. user 12). For example, the user may input a title for the course, input educational materials (e.g. slides, readings, audio recordings), select course competencies and objectives, etc. which the user desires to include as part of the customized course framework.

At step 60, in response to the first inputs received from the user, as well as from educational design elements (see box 62) (e.g. predefined educational theory components, decision trees for the system 10) the course design module then generates and presents at least one modified course parameters. For example a modified course parameter could be a suggestion about a particular course structure the user may wish to take, a presentation of a predefined list of course objectives or competencies based on previously received input (e.g. the first inputs).

At step 64, the course design module receives at least one second input associated with the modified course parameter from the first user. For example, the user may select a particular course objective from a list presented at step 62. In some embodiments, for example, where there are additional course components to review, the method 50 can return from step 64 back to step 54, where a different course component can be presented. In other embodiments, the method 50 can proceed from step 64 to step 66.

At step 66, the system (e.g. system 10) generates a customized course framework based on the first and second inputs received from the first user. In some embodiments, where the customized course framework has already been generate, the system may alternatively modify the customized course framework.

At step 68, the course framework may be presented to a second user (e.g. users 12 who are participating in the course). This may be in response to a request from the second user to accessing his or her course information, for example.

Figure 3:
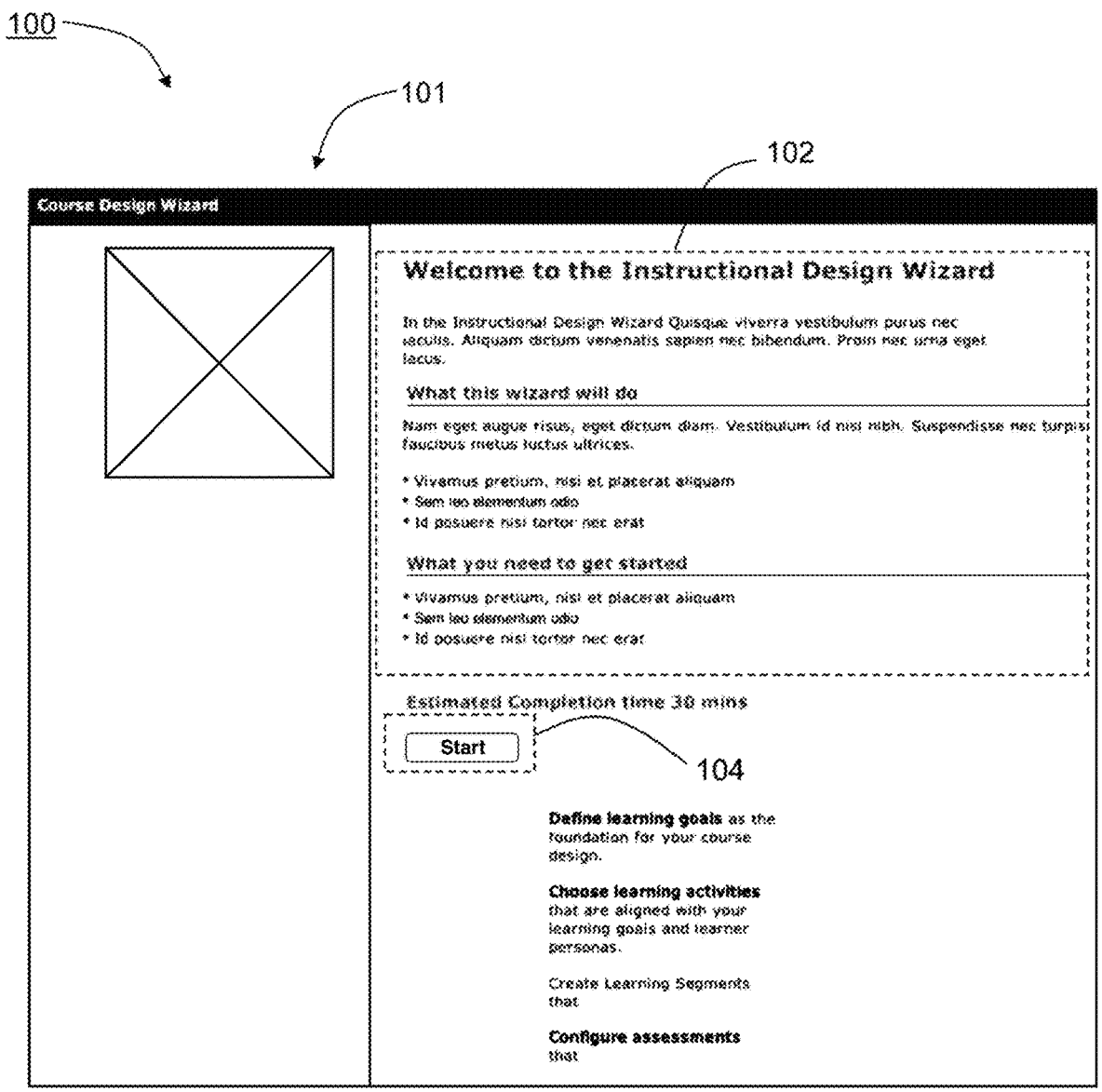
FIG. 3 is a screenshot of a welcome page for a course design module in a system for providing guided instructional design according to some embodiments.

Turning now to FIG. 3, a screenshot of a welcome page 101 for a course design module 100 for a system for providing guided instructional design is shown according to one embodiment. For example, the course design module 100 may be provided using the system 10 generally as described above.

When the user (e.g. first user 12) initiates the course design module 100, one or more course components may be presented to the user in relation to the particular course being designed. Each course component also includes one or more course parameters, which are elements of the various course components and which may guide the user through the course design process (e.g. using natural language elements), and will respond dynamically to inputs from the user in order to generate and/or modify a customized course framework for that course.

In particular, the course parameters may provide guidance to the user in selecting and arranging various elements for the course. Normally, the course parameters include objects (e.g. text) presented to the user in a plain or natural language format using terminology that will be familiar to the user. For example, the natural language may include terms selected from known educational terms (e.g. terms taken from Bloom's educational taxonomy, etc.)

The course parameters may also include one or more simple graphical user interface (GUI) controls (e.g. text boxes, radio buttons, check boxes, dropdown lists, etc.) for receiving input from the user in association with some of the natural language objects.

By using a combination of natural language objects and simple controls, the user (who will often have limited programming or other computer skills) can select desired course elements (e.g. course competencies, objectives, modules, learning materials, etc.) that can then be used to generate a customized course framework.

Returning again to FIG. 3, the welcome page 101 (and other pages) of the course design module 100 may be presented as one or more webpages that may be accessed using a web browser (e.g. Internet Explorer, Firefox, Safari, Chrome, etc.) using one or more computing devices 20. For example, as shown, the welcome page 101 is presented as a webpage that includes a plurality of display areas (e.g. one or more frames).

As shown, the welcome page 101 can include one or more text areas 102 (which may include some introductory remarks, information that may assist the user 12 in preparing a particular course, etc.). The welcome page 101 also include controls such as "start" button 104, which initiates the course design module 100 (and may activate the chose competencies page 110 shown in FIG. 4).

In some embodiments, the welcome page 101 may require the user to authenticate him or herself (e.g. using a login name and password) to navigate through the course design module 100.

Figure 4:
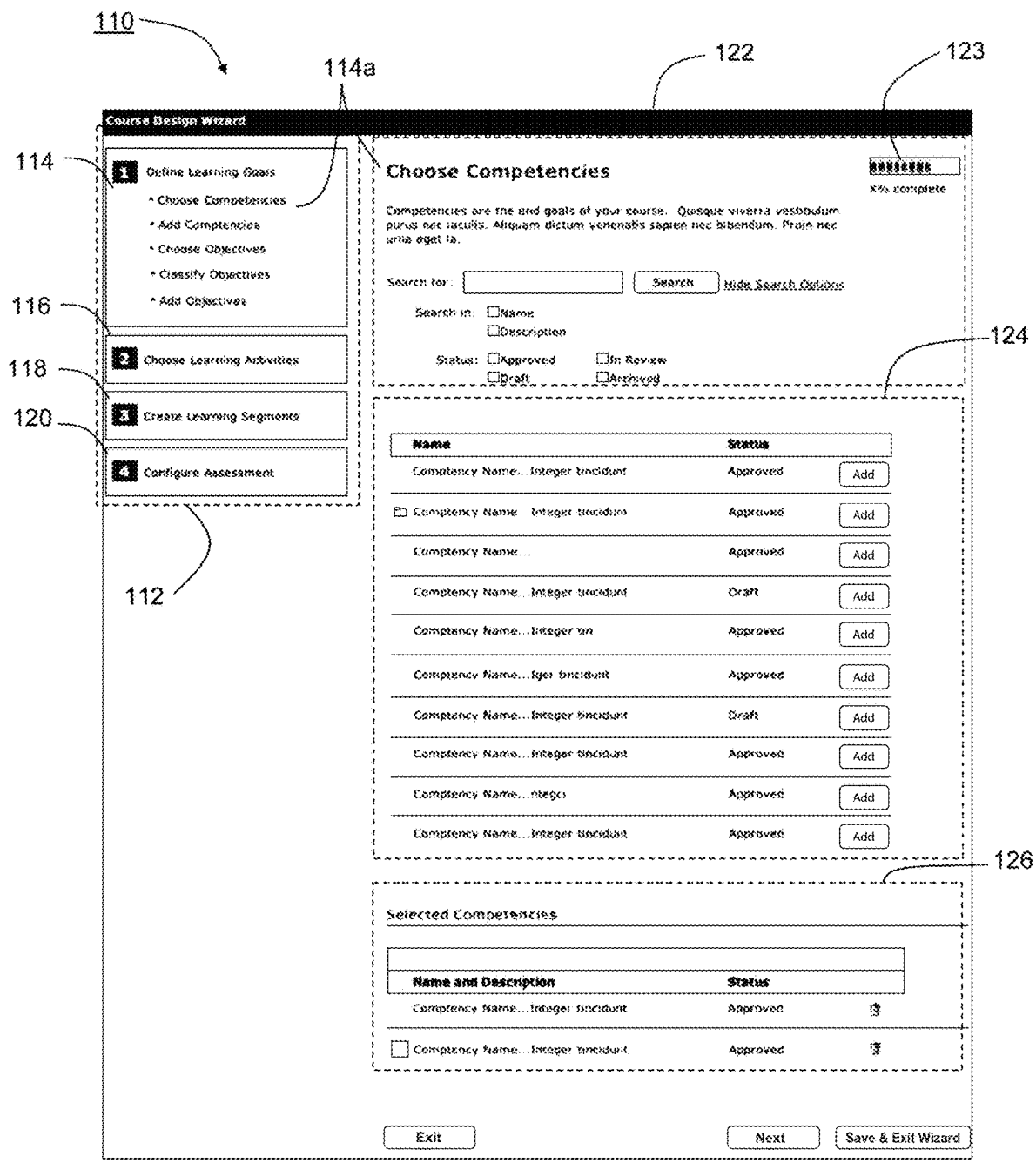
FIG. 4 is a screenshot of a choose competencies page for the course design module of FIG. 3.

The sequence of the course design module 100 can vary greatly, but in some embodiments the first page that is displayed after the welcome page is a choose competencies page 110 (as shown in FIG. 4).

In this embodiment, the choose competencies page 110 includes a progress indicator area 112 provided on a left side of the page 110, and one or more content areas 122, 124, 126 provided on a right side of the page 110. It will be understood, however, that the particular position and size of the areas on the webpage may be generally varied and is shown only here according to one exemplary configuration.

The progress indicator area 112 may shows some or all of the course components for the particular course that the user is generating. The progress indicator area 112 may also be modified as the user moves through the course design module 100 (e.g. the list of items in the progress indicator 112 area may dynamically change as course competencies are added, for example).

Each course component is normally presented using natural language that the user would be familiar with and/or capable of understanding. For example, in this embodiment, the progress indicator area 112 lists four board course components: define learning goals 114, choose learning activities 116, create learning segments 118, and configure assessment 120. These four course components have natural language identifiers that use terms based in educational theory and would be familiar to some if not most users of the learning system 10.

The progress indicator area 112 may also show the relative location of the user as the user navigates through the course design module 100. For example, as shown in FIG. 4, the active course component (or sub-component) is highlighted. In this figure, the course sub-component is "choose competencies" 114a (which is a sub-component of the define learning goals 114 component). The term "choose competencies" 114a is also displayed as the title of the page 110 within the content area 122.

As shown, each of the content areas 122, 124, 126 may include one or more course parameters that may include one or more natural language objects and one or more controls.

As discussed above, the course parameters are presented to guide the user through the course design process, and can assist the user by prompting the user for specific inputs (e.g. text inputs, decisions, etc.) associated with specific language objects. Based on those inputs the system can then generate a customized framework for that course.

Previous inputs may also be used to modify or generate new course parameters that are presented to the user. For example, as shown in FIG. 4, the first content area 122 includes a first course parameter with a control (e.g. a search box) that allows the user to search for course competencies. For example, the user can input one or more keywords into the search box and then activate the search by activating a control, such as the "search" button shown. In some instances, the search box may allow for advanced search options (e.g. Boolean searching, etc.).

Generally, course competencies are broad goals for the course, and could include standardized competencies, such as prerequisites for taking the course (e.g. course participants are expected to have satisfied US high school level biology requirements), as well as desired post-course competencies (e.g. the course participants must meet specific standards for grade schools as defined by a state or other government entity, the participants must have an understanding of biology at a first year university level, etc.). The term "course competencies" is a natural language term based on educational theory that will be understood by the user.

In this embodiments, the results of the search conducted using the first content area 122 can then be displayed in a second content area 124 as another course parameter (e.g. a list of user-selectable course competencies).

In some embodiments, the list may be generated from a predefined data set, which may be stored in one or more of the data storage devices 34. The predefined data set may be predefined by another user (e.g. user 40), by an organization, or by the first user (e.g. user 14).

As shown, the list may also display some predefined properties for each competency, such as the name, status (e.g. approved by the educational institution, pending approval, draft for submission, etc.), and a description about the competency (and/or a link to more information).

The list may also include a control (e.g. an "add" button) each particular competency. For example, by selecting the "add" button, the user can choose to add one or more competencies to the course. In some embodiments, some competencies may be automatically added, for example where they are mandatory for a particular course.

On the choose competencies page 110 the third content area 126 shows another course parameter, which is a list of the currently selected course competencies. In some embodiments, the user may be able to delete competencies from this list using another control (e.g. by selecting a trash icon).

Generally, the choose competencies page 110 of the course design module 100 can assist the user in finding potential competencies from predefined data (e.g. the user can use keywords to find competencies), presents the results so they can be reviewed by the user, and then allows desired competencies to be added. The use of natural language (e.g. including educational theory terms), simple controls (e.g. search boxes, buttons, etc), and dynamic parameters (e.g. search results) that respond to user inputs will be intuitive to most users and will tend to make it easy for the users to design particular components of the course.

In some embodiments, one more of the pages (e.g. the choose competencies page 110) may include a progress bar 123 that indicates a percentage of the course design process that has been completed.

Figure 5:
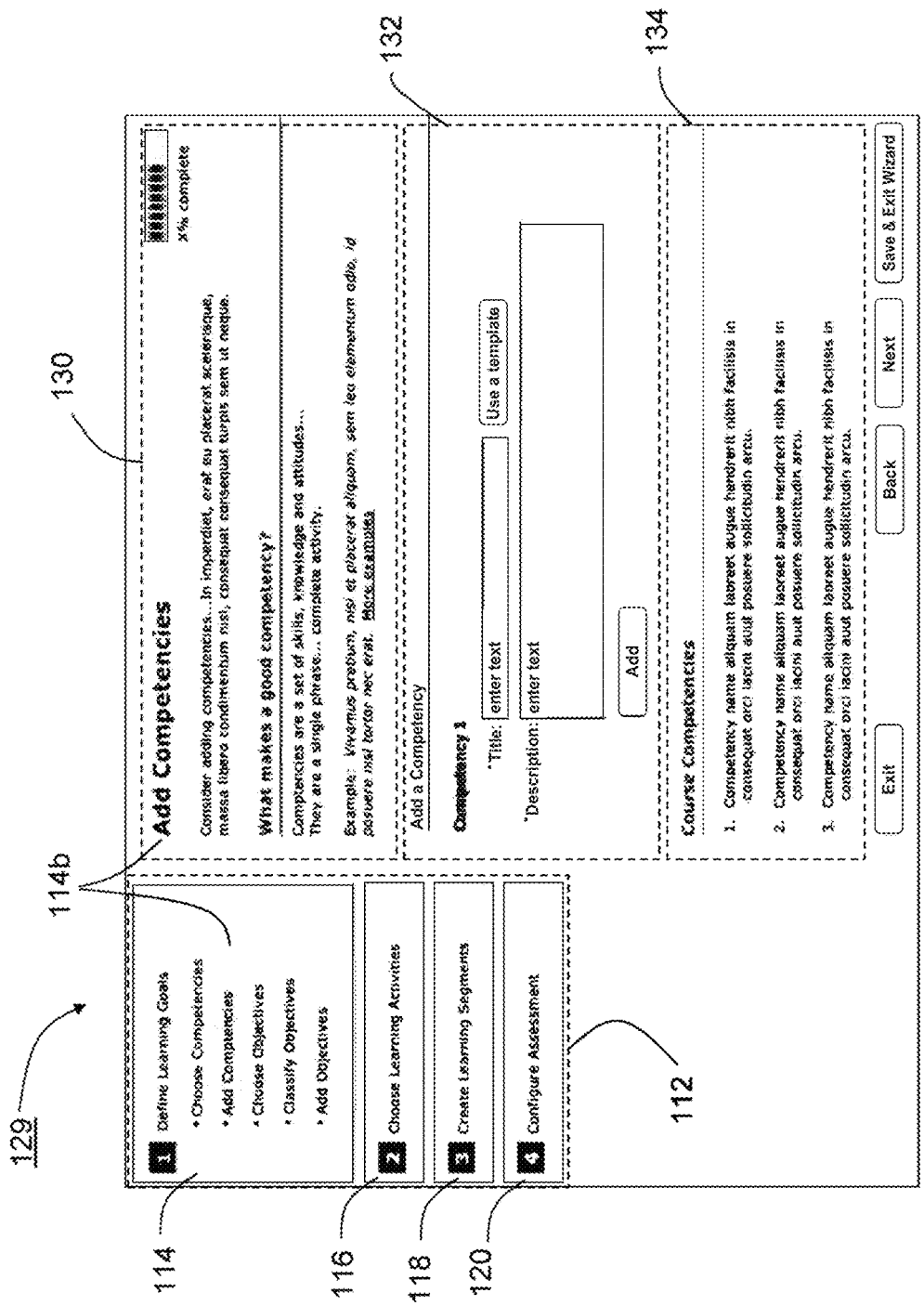
FIG. 5 is a screenshot of an add competencies page for the course design module of FIG. 3.

In some instances, the user may not find a desired competency on the choose competencies page 110. For example, the predefined competency list may not have a particular competency being searched for. Accordingly, the user may wish to create customized course competencies for this course. The user can then proceed to an add competencies page 129 as shown in FIG. 5. In this figure, the active course sub-component is "add competencies" 114b, as highlighted in the progress indicator area 112 and listed as the title of the page 129.

The add competencies page 129 includes a first content area 130 which can include natural language objects (e.g. text and other information) which may be useful in explaining to the user how a course competency may be created. The first content area 130 may also include links to more information or examples, which can be useful if the user desires more information, such as from an external webpage or another page within the course design module 100.

The add competencies page 129 also includes a second content area 132 with course parameters related to adding a new competency. For example, the second content area 132 prompts the user to enter text information (such as a title and a description for the new competency) using various controls, and then allows the user to add the competency to that course using another control (e.g. an "add" button). The user may also be presented with a control to select a template for creating the new competency (for example, an existing competency may be used as a template).

The current list of competencies for the course is shown in a third content area 134, which can dynamically respond to the inputs (e.g. text inputs and selections) of the user.

Figure 6:
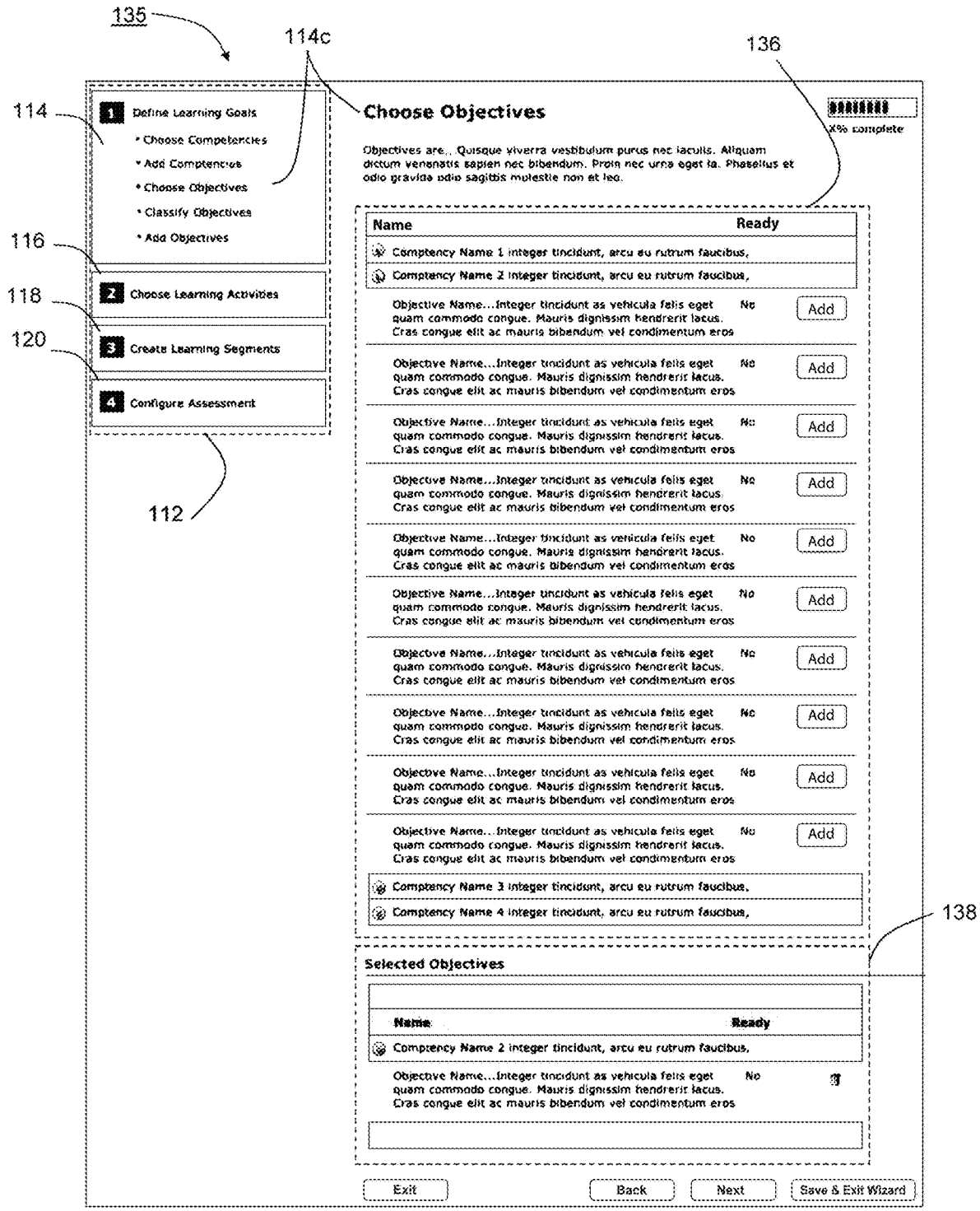
FIG. 6 is a screenshot of a choose objectives page for the course design module of FIG. 3.

Turning now to FIG. 6, once the user has added the desired competencies to the course, the user can navigate to a choose course objective page 135. In this figure, the active course sub-component is "choose objectives" 114c, as highlighted in the progress indicator area 112 and listed as the page title.

Generally speaking, course objectives are more narrowly defined goals that are associated with particular course competencies. For example, course objectives may include performance skills, behavioral objectives, performance objectives and knowledge development objectives. For instance, In a biology course, a course competency could include "understand basic plant biology", course objectives could include the participants performing laboratory experiments, classifying plants and animals, and describe the ecological role of fungi.

On the choose course objectives page 135, a first content area 136 displays course parameters that include a list of course objectives presenting in a natural language format, and button control for adding each objective to the course.

In some embodiments, the list of course objectives may be stored in one or more data storage devices 34, and may be generated based on one or more competencies that were previously selected by the user (e.g. using the choose competencies page 110). For example, for each particular course competency, the choose objectives page 135 may suggest certain course objectives based on a previous user inputs and educational design elements (e.g. aspects of educational theory, historical design information, etc.), and then allow the user to select the desired objectives from the suggested lists.

On this page 135, the selected course objectives for each particular course competency are displayed within a second content area 138.

Figure 7:
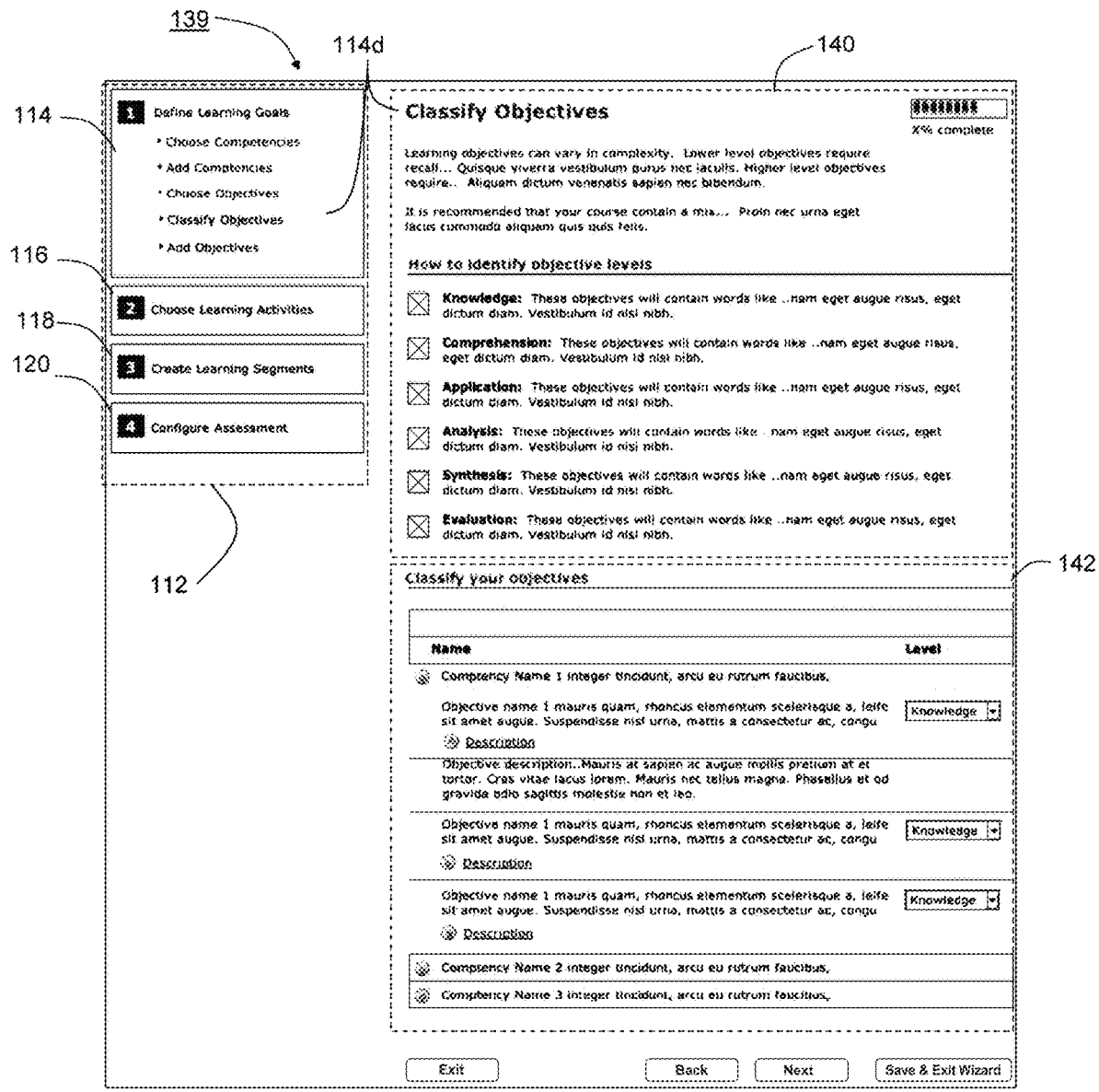
FIG. 7 is a screenshot of a classify objectives page for the course design module of FIG. 3.

Turning now to FIG. 7, after the course objectives have been selected, the user may then navigate to a classify objectives page 139. In this figure, the active course sub-component is "classify objectives" 114d, as highlighted in the progress indicator area 112 and listed as the page title.

Various learning objectives can vary in complexity and type, and it may be desirable to provide a mixture of different types of objectives. For example, according to some educational theories course objectives can be grouped into different categories or levels, such as "knowledge", "comprehension", "application", "analysis", "synthesis", and "evaluation".

As shown in FIG. 7, a first content area 140 may provide information about the various categories of objectives in natural language familiar to the user. The second content area 142 on the other hand may include simple controls that allow the user to associate previously selected course competencies (e.g. the course competencies listed in the content area 138 in FIG. 6) with particular educational levels or categories (e.g. knowledge, comprehension, etc.), for example using a dropdown list.

Figure 8:
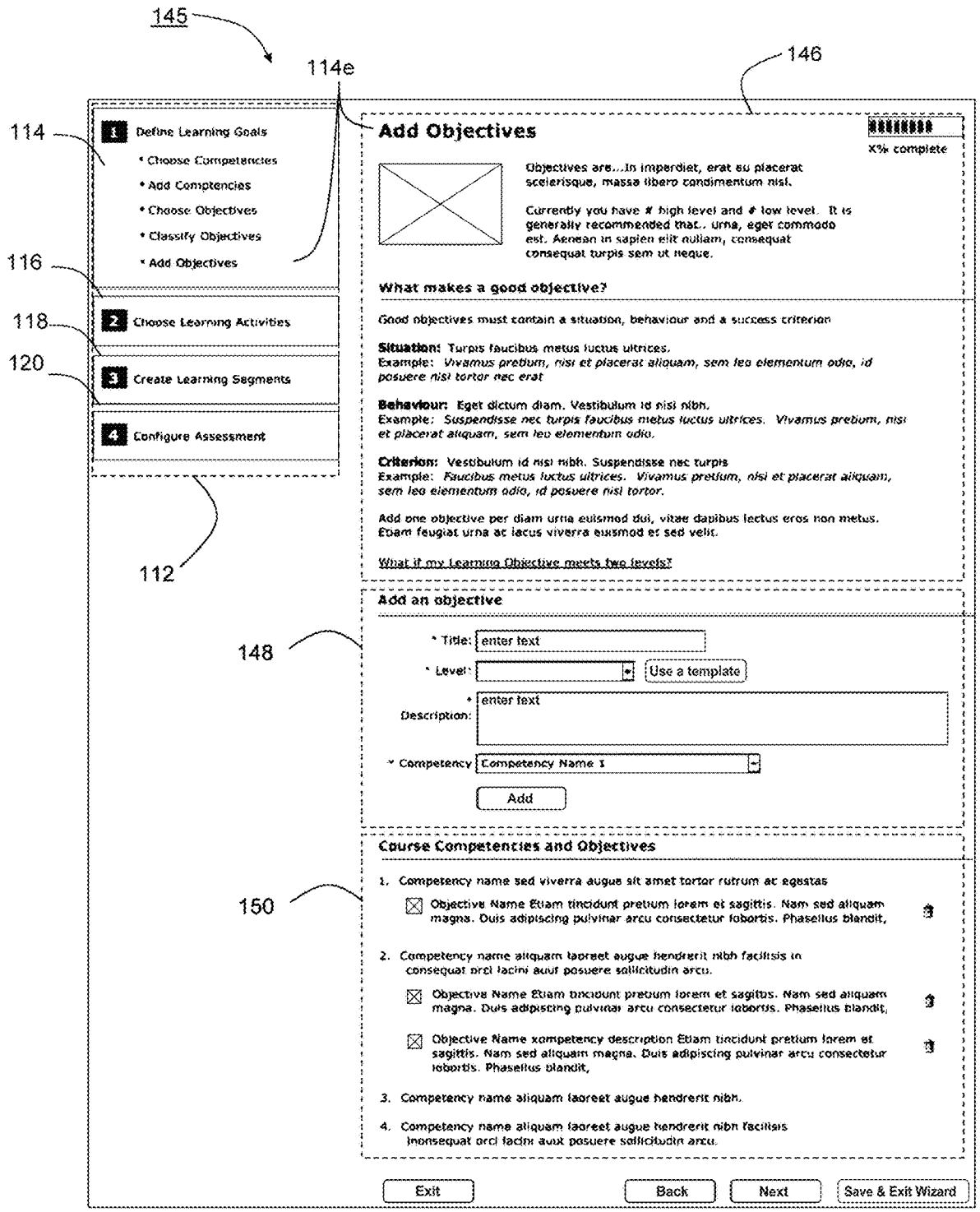
FIG. 8 is a screenshot of an add objectives page for the course design module of FIG. 3.

In some embodiments, the course objectives (e.g. as shown in content area 136) may not satisfy all the course objectives desired by the user. Accordingly, an add objectives page 145 for the course design module 100 may be presented to the user, as shown in FIG. 8. In this figure, the active course sub-component is "add objectives" 114e, as highlighted in the progress indicator area 112 and listed as the page title.

As shown, a first content area 146 may include text and other items that provide the user with guidance about adding a new course objective. For example, the content area 146 may include natural language terms that explain what makes a "good objective" as well as definitions of terms for the user to review, which could be based on educational theories.

The second content area 148 includes course parameters related to adding a course objective. For example, as shown the user is prompted to provide a title for the course objective in a text box control, select a suitable level or category (e.g. knowledge, comprehension, etc.) from a dropdown list control, enter a description in another text box control, and select a competency which the new objective will be attached to (e.g. one of the previously defined competencies) using another dropdown list. The new objective can then be added to the course using an "add" button.

On this page 145, a third content area 150 lists the current course competencies and selected course objectives for the competencies.

Figure 9:
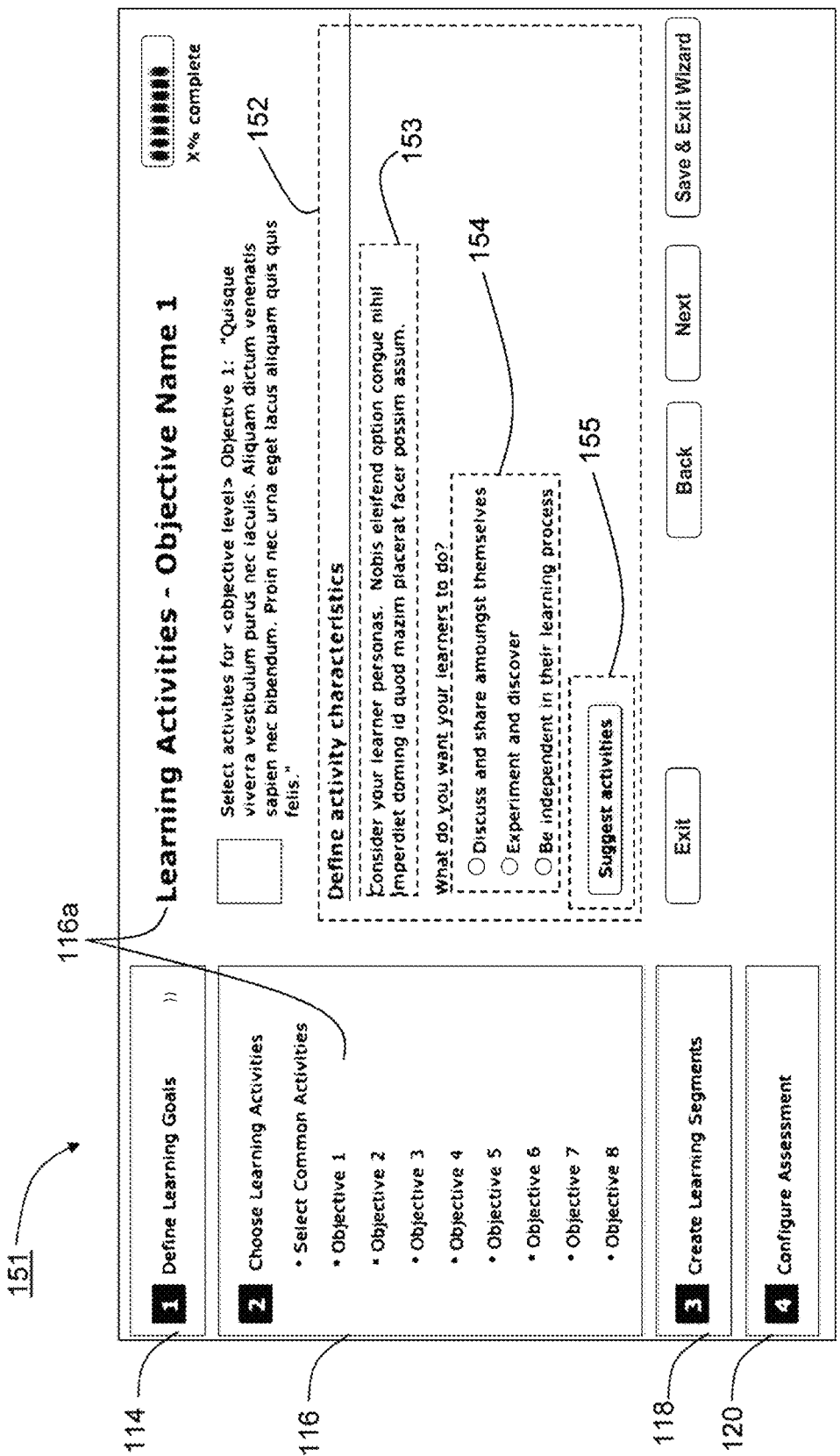
FIG. 9 is a screenshot of a learning activities page for the course design module of FIG. 3.

Turning now to FIG. 9, the user may be presented with a learning activities objectives page 151 for adding one or more activities to each of the course objectives. In this figure, another broad course component (e.g. choose learning activities 116) is presented to the user via one or more sub-components. For example, the active course sub-component is "Objective Name 1" 116a, as highlighted in the progress indicator area 112 and listed as the page title, which corresponds to the first objective selected using the choose objectives page 135.

This page includes a first content area 152 which can include course parameters, such as natural language text about things the user should consider when defining activities 153, radio button controls 154 for selecting particular activity types (e.g. whether the course participants should be independent, work as a group, or experiment and discover), and a button control 155 for suggesting activities given the inputs of the user in combination with education design elements (e.g. educational theories, educational taxonomies, etc.).

Figure 10:
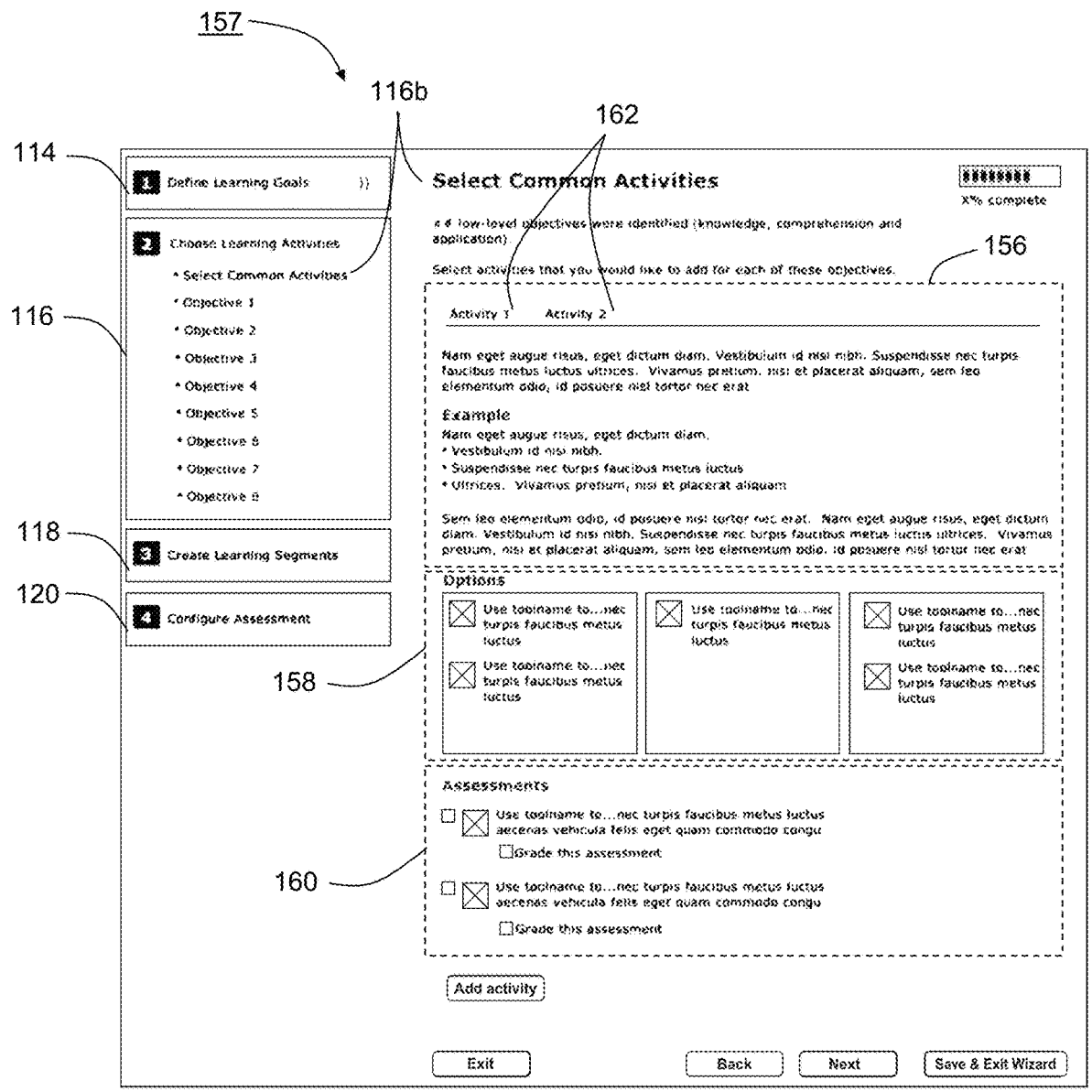
FIG. 10 is a screenshot of a select common activities objectives page for the course design module of FIG. 3.

For example, suggested activities may be displayed on a select common activities page 157 as shown in FIG. 10. In this figure, the active sub-component is "Select Common Activities" 116b.

The select common activities page 157 allows one or more activities to be associated with the previously defined course objectives. For example, in a biology course, suppose that one of the course objectives includes the requirement that course participants be able to perform basic biology laboratory experiments. Using the page 157 shown in FIG. 10, the user could then select suitable activities for reaching that course objective, such as: reviewing lab equipment to learn equipment names, preparing an experiment plan with group, conducting the experiment, and preparing a report about the experiment.

The suggested activities can be displayed in a first content area 156, where the activities may be explained in plain language and possibly organized using tabs 162. The user may select particular options for each activity using controls provided in a second content area 158. In some cases, a third content area 160 may display one or more assessments that can be associated with the particular activities.

Generally, the learning activities page 151 and select common activities page 157 may be displayed for each of the previously selected course objectives so that the desired course framework can be developed.

Figure 11:
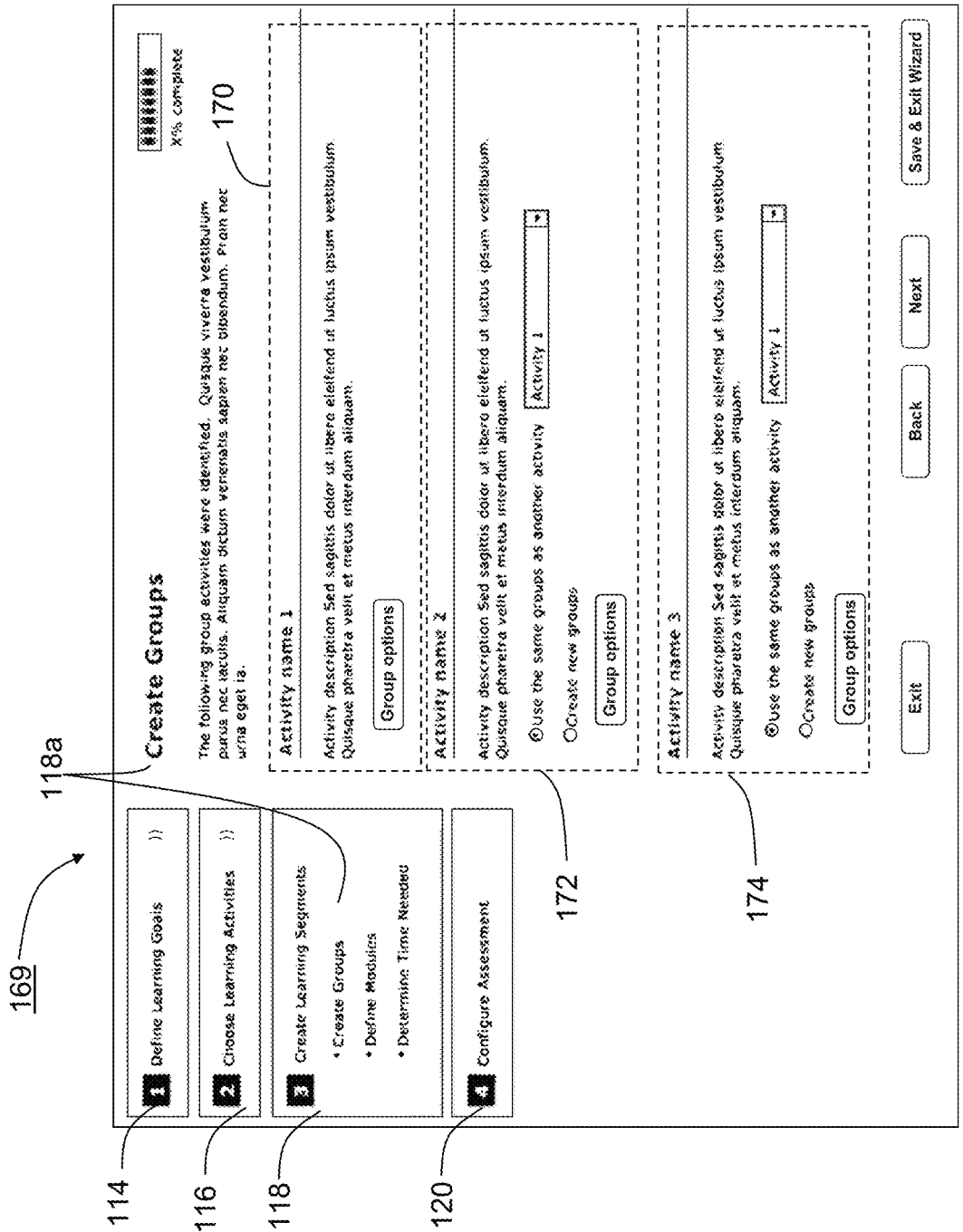
FIG. 11 is a screenshot of a create groups page for the course design module of FIG. 3.

Turning now to FIG. 11, for some activities the user may desire to organize the participants into groups (e.g. users 14 may be organized into a group 18). If so, the create groups page 169 may be displayed. On this figure, the sub-component "create groups" 118a of the course component create learning segments 118 is active.

The create groups page 169 can be used to define group options (e.g. the number of users in each group, whether the users can create their own groups or have groups randomly assigned, whether the same groups are to be used for multiple activities, etc.) using course parameters providing in various content areas.

For example, as shown three content areas 170, 172, 174 are presented for three activities. The first content area 170 presents course parameters for a first activity including natural language objects, and allows group options to be selected using controls. The second and third content areas 172, 174 allow previously defined groups to be used or a new group to be created for each of the activities.

Figure 12:
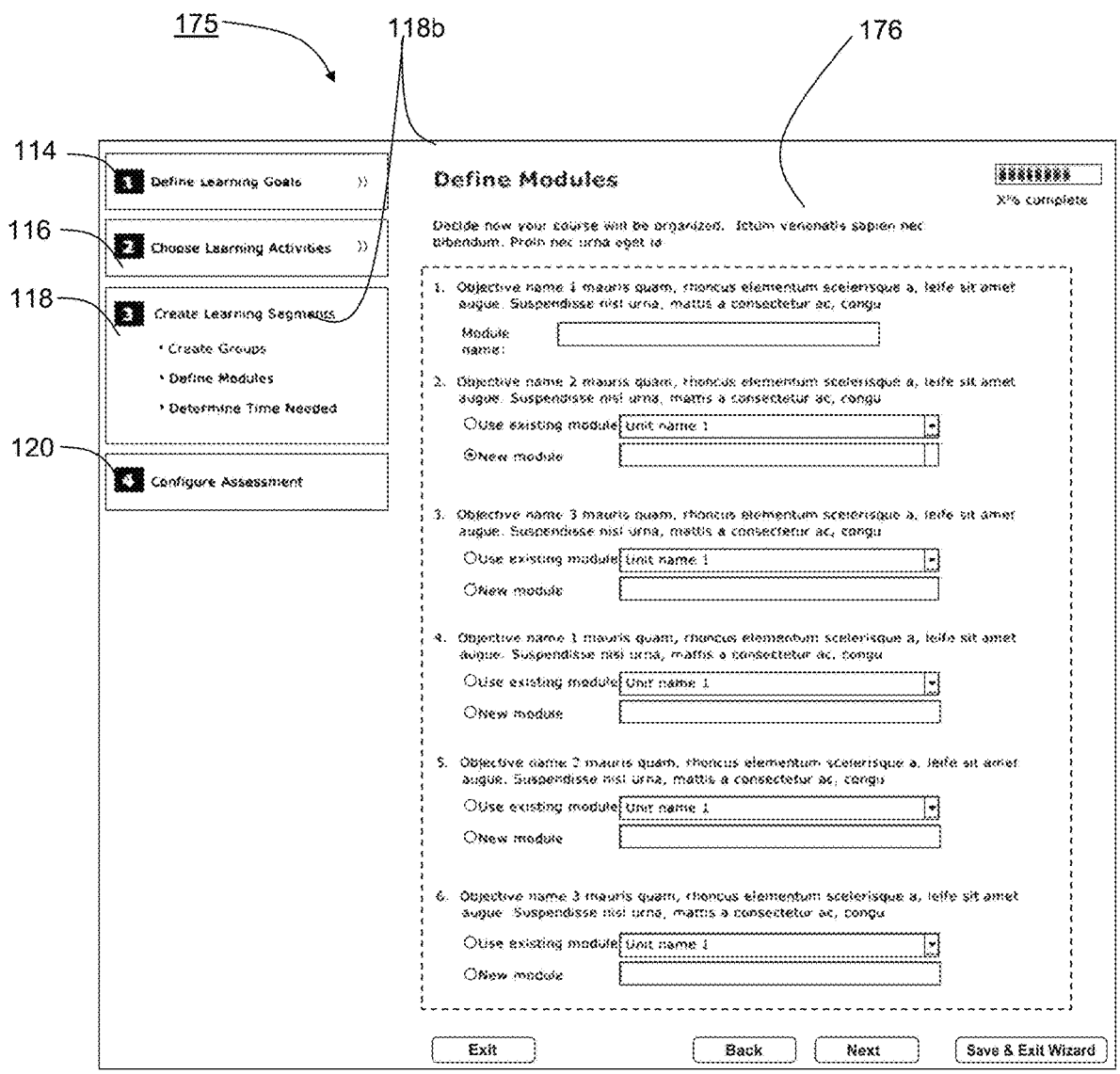
FIG. 12 is a screenshot of a define educational modules page for the course design module of FIG. 3.

Turning now to FIG. 12, the next step in the course design module 100 may be to define educational modules using a define modules page 175. Generally, each educational module may be a functional group of one or more of the previously defined course objectives (e.g. an educational unit or topic) which defines how the course is to be organized. For example, in a math course, educational modules could be topics such as: fractions, addition, multiplication, exponents, etc.

As shown, various course parameters can be displayed in a content area 176, and include controls that allow the user to select modules for each of the previously defined course objectives (e.g. using radio buttons and dropdown lists).

Figure 13:
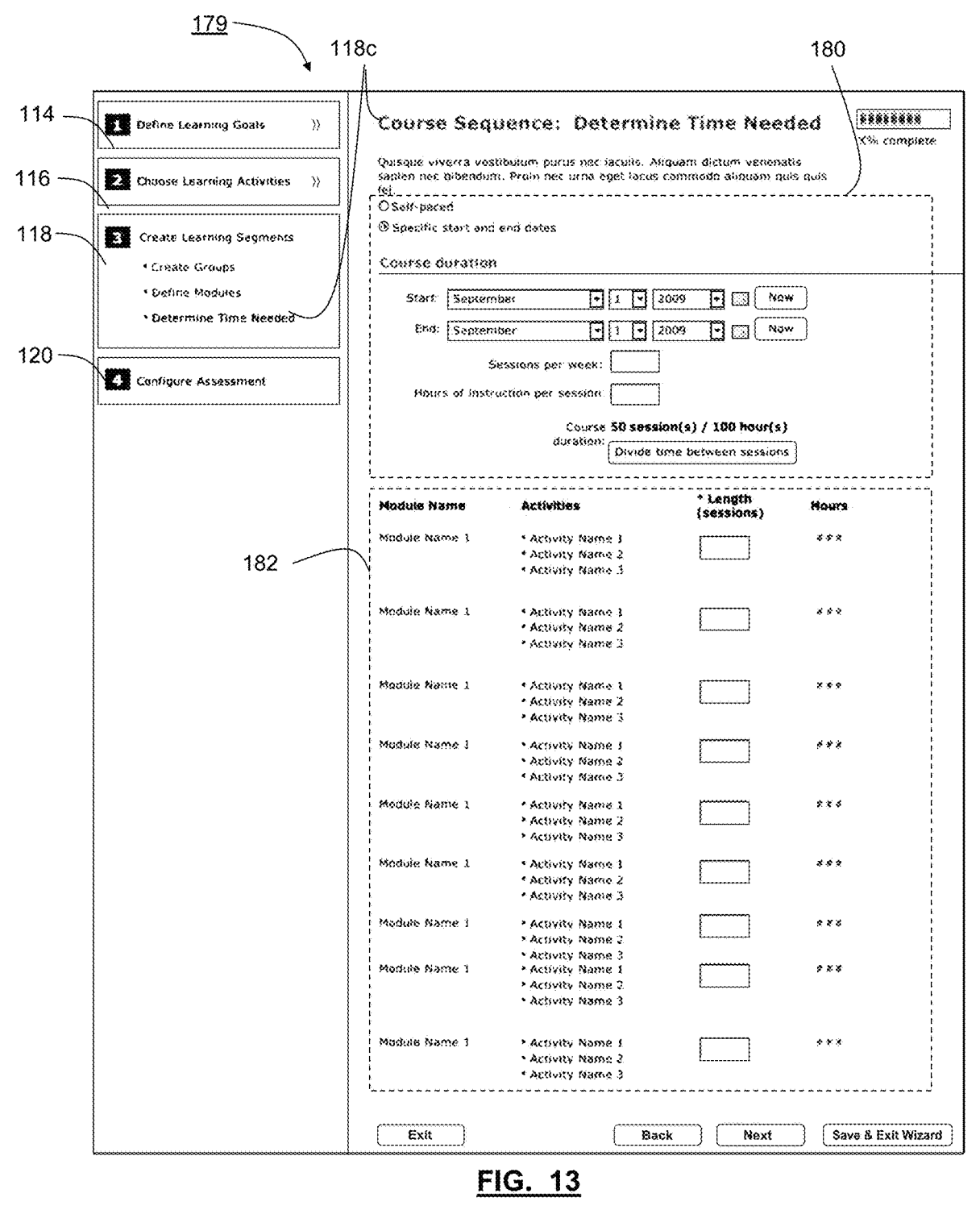

Turning now to FIG. 13, once the course modules have been defined, these can be displayed as parameters on a course sequence page 179. The course sequence page 179 can include a plurality of language objects and controls for creating a temporal structure to the course. This may include making the course self-paced or defining specific start and end dates, associating the course with calendar days or months, and determining the number of sessions per week (as shown in the first content area 180), as well as assigning time or sessions for each of the previously defined educational modules.

Turning now to FIG. 14, the next step in the course design module 100 may be to present the user with a select grading system page 183. In this figure, another broad course component (e.g. configure assessment 120) is presented to the user, with the course sub-component "select grading system" 120a being active.

On this page 183, the user can select one or more grading systems for the course based on the displayed course parameters displayed in content areas 184, 186 (which could include suggesting proposed course grading systems as natural language objects and presenting controls such as radio buttons and checkboxes for selecting the desired grading system).

Figure 15:
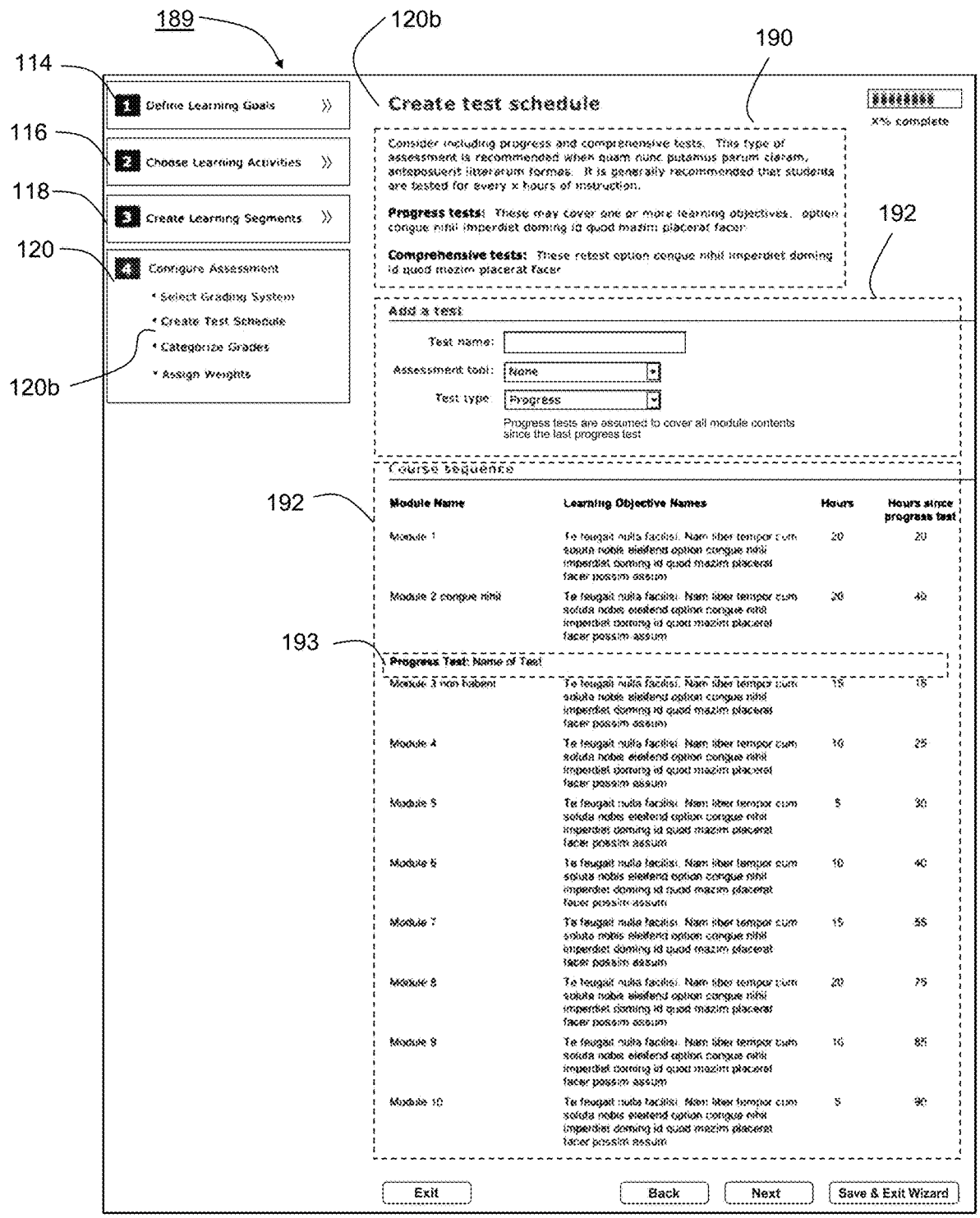
FIG. 15 is a screenshot of a create assessment schedule page for the course design module of FIG. 3.

Once the grading system has been selected, the assessment schedule can be determined using as assessment schedule page 189 as shown in FIG. 15. In this figure, the active sub-component is "create test schedule". This page 189 may present course parameters including natural language information about various types of tests (e.g. progress tests and comprehensive tests) displayed in a first content area 190, controls for adding a test in a second content area 191, and a course sequence displayed in a third content area 192 (and including one or more test events 193 therein).

In some embodiments, the natural language information or objects may be based on educational theory. For example, information as to whether a certain type of assessment (e.g. a multiple choice exam) is appropriate for particular subject matter (e.g. math courses) may be presented.

Figure 16:
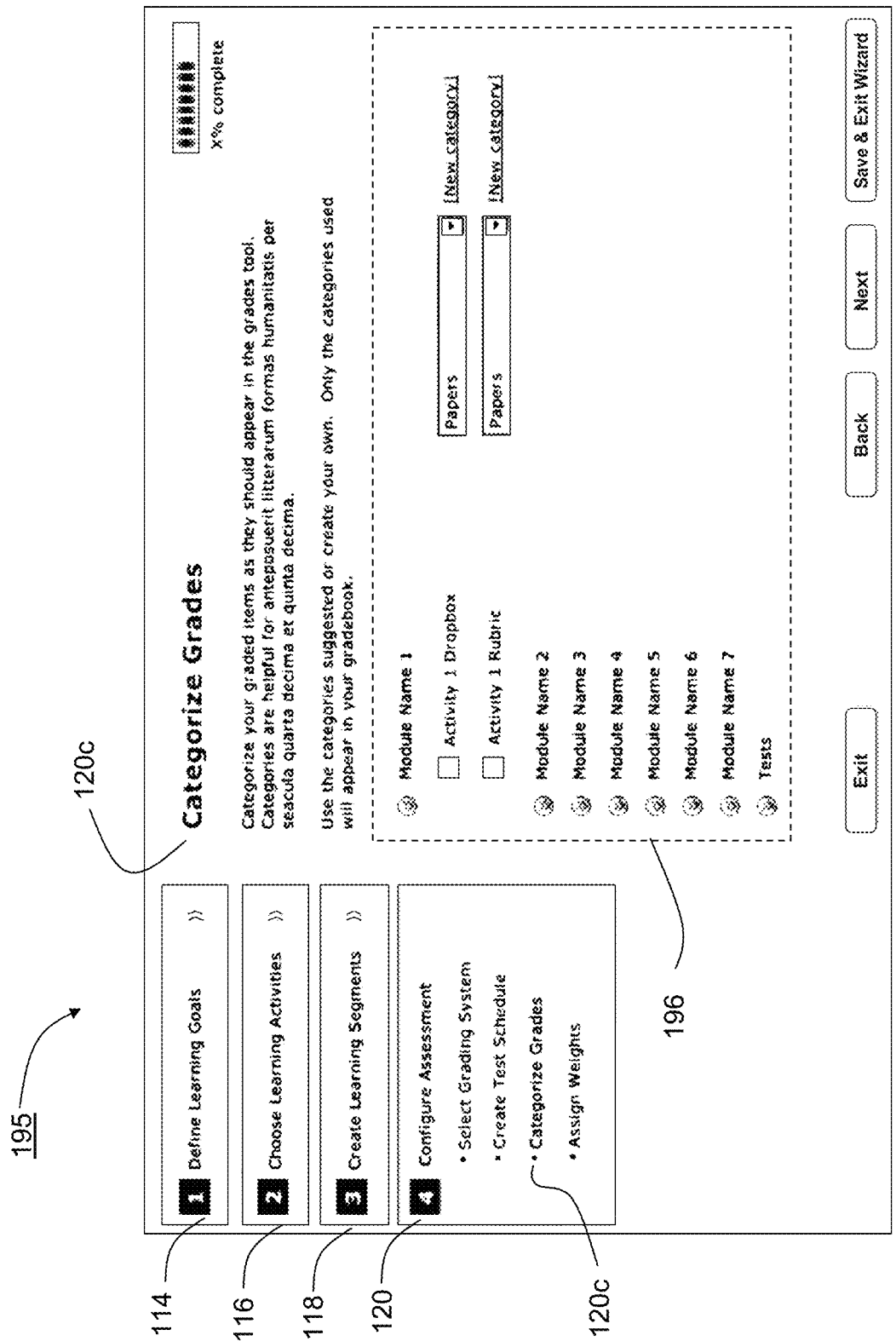
FIG. 16 is a screenshot of a categorize grades page for the course design module of FIG. 3.

The next step in the course design module 100 may be to categorize grades using a categorize grades page as shown in FIG. 16. The active sub-component in this figure is "categorize grades" 120c.

Using the categorize grades page 195, the user can categorize the graded items (e.g. assignments, etc.) as they should appear in a grades tool, for example. Course parameters may be presented in a content area and include a list of the modules and activities, as well as tests, and may allow the user to intuitively categorize the graded items for those activities and tests (in some cases using predefined categories or by allowing the user to generate new categories).

Figure 17:
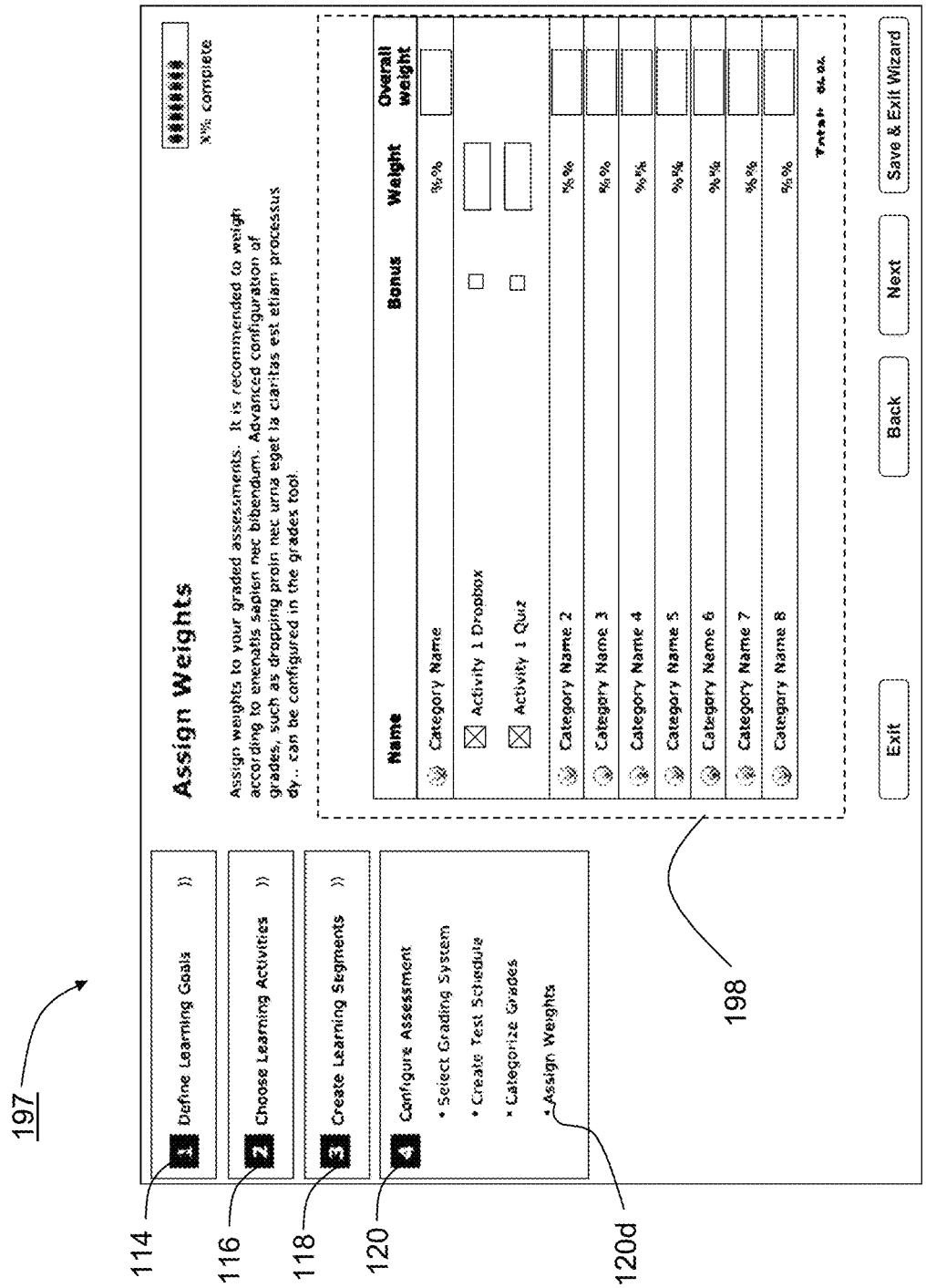
FIG. 17 is a screenshot of an assign weights page for the course design module of FIG. 3.

Finally, as shown on FIG. 17, in some embodiments the user may be presented with the option to assign weights for the different activities using an assign weights page 197. For example, the previously defined categories and activities may be presented along with various controls (e.g. text boxes, checkboxes, etc.) for selecting the desired weights.

The course design module 100 is now complete, and the user can be presented with a completion page as shown in FIG. 18. The completion page may include a summary of the actions taken in designing the course, and may also allow the user to re-enter the course design module 100 to make changes, edit various course parameters, etc.

The course design module 100 can now generate a customized course framework for this course. The course framework can incorporate all of the various elements (e.g. competencies, objectives, activities, assessments, etc.) as based on the inputs from the user at the various stages of the course design module as well as educational design elements (e.g. educational theories, decision matrices for particular educational institutions, historical information, etc.).

At this point the user may be free to assign content and assessments to the framework provided with confidence that they are following educational "best-practices". In some embodiments, the user may assign content and assessments via a "drag-n-drop" interface to take their specific materials and align them to the objectives and activities that they set out using the course design module 100.

Figure 19:
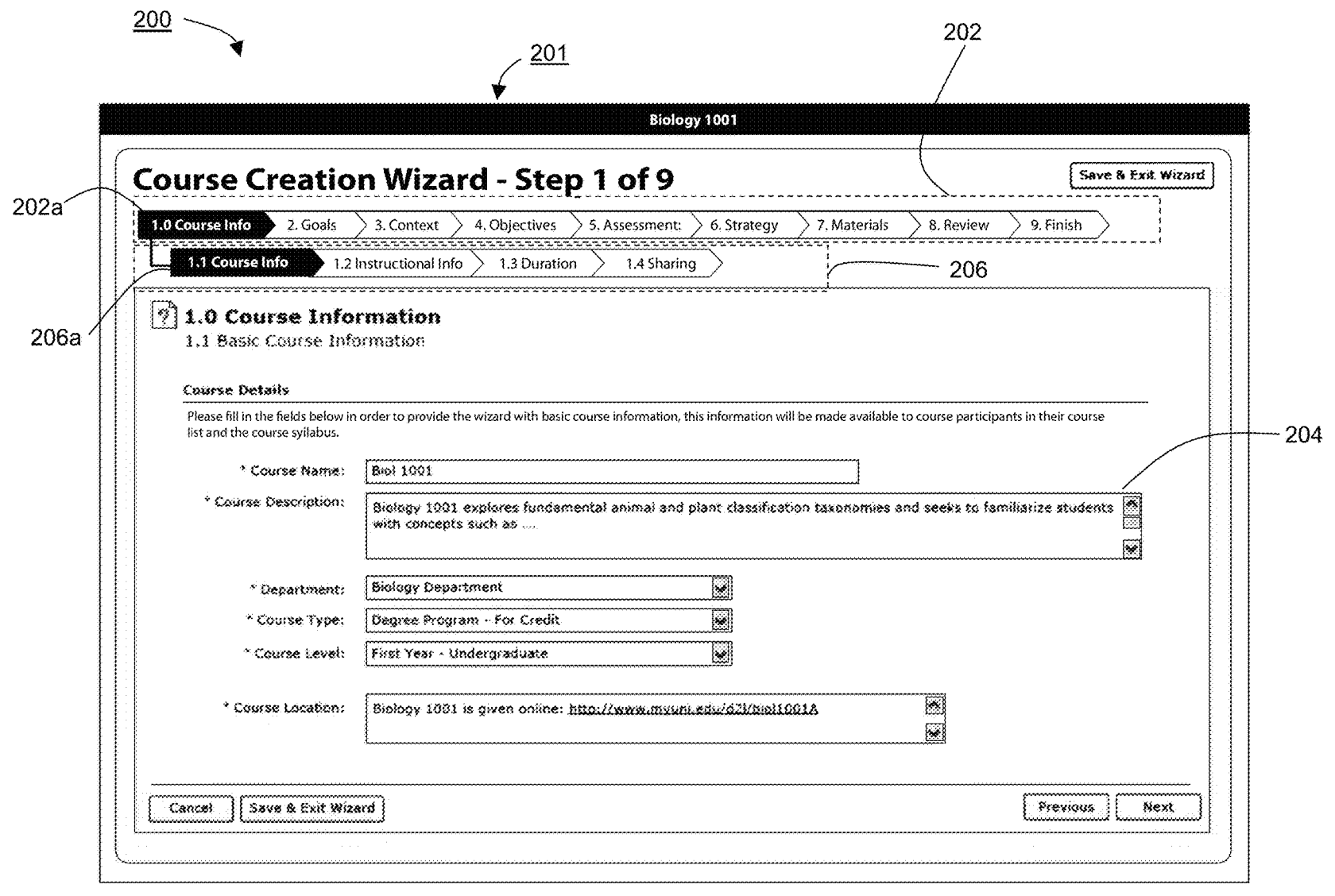

Turning now FIG. 19, illustrated therein is a course design module 200 (or "course design wizard") according to yet another embodiment.

Generally, the course design module 200 is similar to the course design module 100, and presents course parameters for the user, receives inputs from the user in association with those course parameters, and then repeatedly presents new or modified course parameters based on those inputs until the course design is completed. Once complete, the course design module 200 can generate a customized course framework that incorporates the various elements selected and organized by the user.

For example, the course design module 200 includes a course info page 201, which may be the first page displayed to the user. The various pages (including the course info page 201) may display various course components 202 (e.g. goals, context, objectives, assessments, strategies, materials, etc.), with the currently active component highlighted (e.g. "course info" 202a).

Various sub-components for each component may also be listed, where applicable. For example, in this embodiment the sub-components 206 are listed and a "course info" sub-component 206a is active.

The course info page 201 can display course parameters in a content area 204. As with the course design module 100 above, the course parameters can generally include information presented to the user as natural language objects (e.g. text, which may or may not be rooted in educational theories and taxonomies), as well as controls for receiving inputs from the user in association with the natural language objects.

For example, as shown in FIG. 19 the user could be prompted to input text information about the course name, description and location using text field controls, select department, course type and level from dropdown lists.

Various controls can also be used to navigate through the various pages of the course design module 200 (e.g. buttons for "Next", "Previous", "Save & Exit Wizard", etc.).

Figure 20:
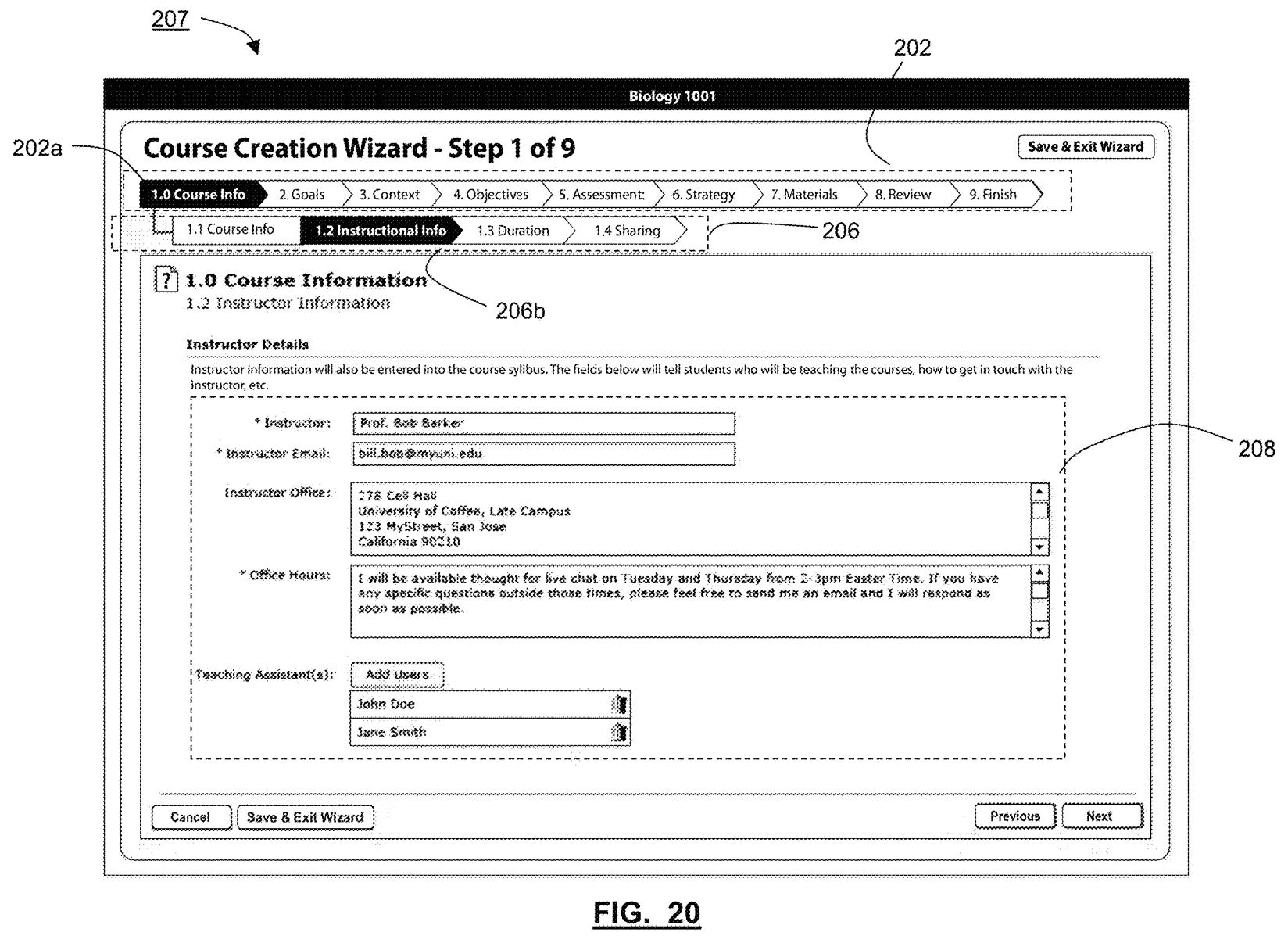

Turning now to FIG. 20, an instructor info page 207 of the course design module 200 may be the next screen presented to the user (with the "instructor info" 206b sub-component being active). This page 207 may prompt the user to input information about the instructor, such as name, email address, office information, and office hours using text fields.

The user may also be able to associate other users (e.g. teaching assistants, lab technicians, etc.) with the course. These added users may be displayed as a list that is dynamically updated in response to the user inputs.

Figure 21:
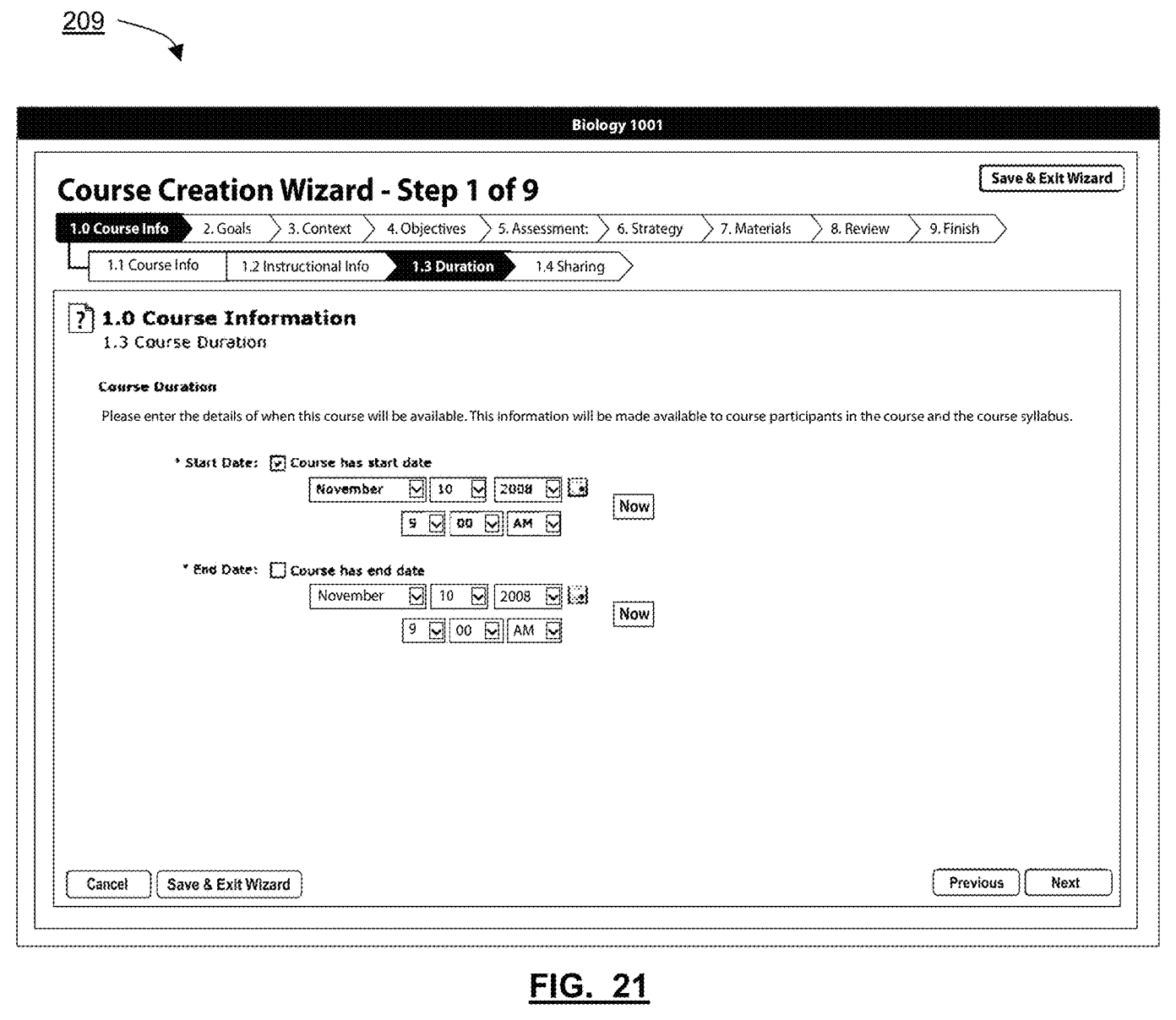

Turning now to FIG. 21, the next page in the course design module 200 may be a course duration page 209, which may allow the user to select start and end dates for the course using various controls shown in the content area 210. The "duration" 206c sub-component is highlighted as being active in this Figure.

Figure 22:
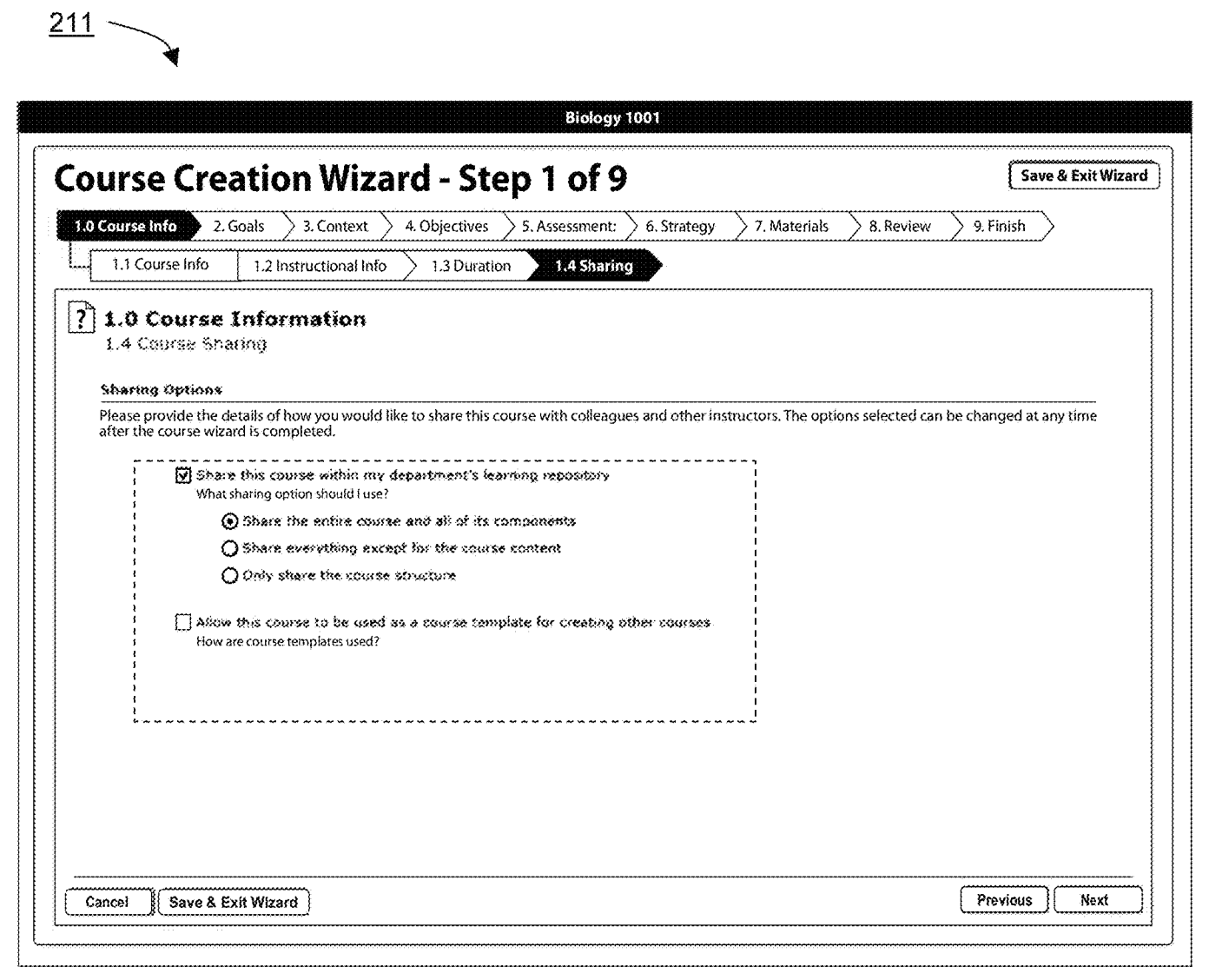

The next page in the course design module 200 may be a course sharing page 211 as shown in FIG. 22 (with "sharing" 206d highlighted as the active sub-component).

The sharing page 211 may allow the user to share all or parts of the course and/or its components within a learning repository where it can be accessed by other users who are creating courses. For example, a content area 212 may provide various control for allowing the user to select whether to share the entire course, everything except the course content, or just the structure of the course.

Figure 23:
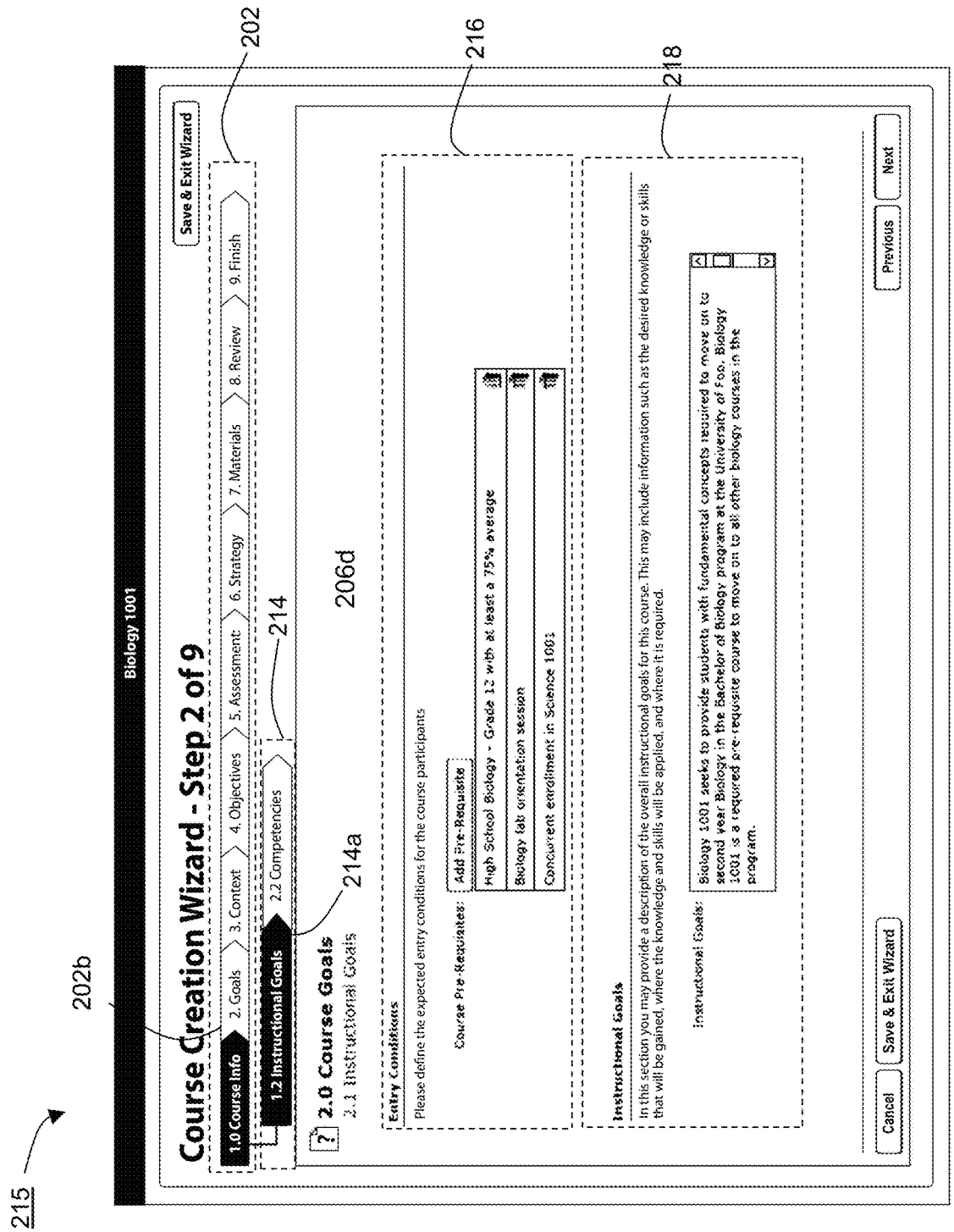
FIG. 23 is a screenshot of an instructional goals page for the course design module of FIG. 19.

Turning now to FIG. 23, a goals 206b course component is presented on an instructional goals page 215 (with "instructional goals" 214a highlighted as the active sub-component 214 of the broad component "context"). The goals page 215 may allow the user to add broad goals for the course, including adding course pre-requisites using natural language objects and controls as shown in the first content area 216 (e.g. course participants must have completed high school biology with a 75% minimum average, must have attended a lab orientation session, etc.) and instructional goals using natural language objects and controls shown in the second content area 218 (e.g. "Biology 1001 seeks to provide participants with the skills to move on to a second year biology course").

Figure 24:
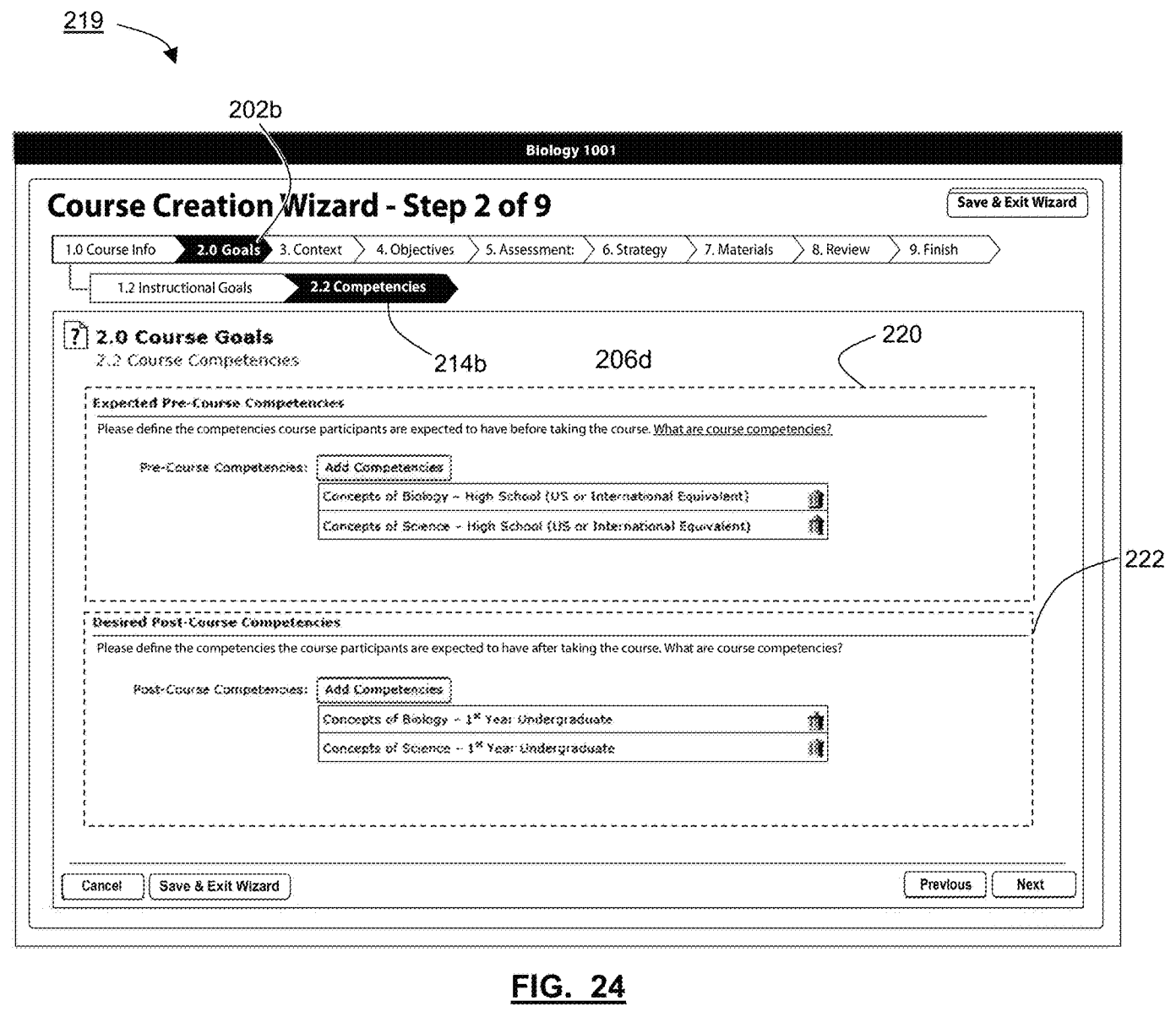

The user can then also add one or more course competencies, using the course competencies page 219 shown in FIG. 24 (with "competencies" 214b highlighted as the active sub-component 214). For example, pre-course competency requirements can be added using controls in a first content area 220 (e.g. the participants must have completed high school biology and high school science), while desired post-course competencies can be added using controls in a second content area 222 (e.g. participants must understand first year science concepts).

Figure 25:
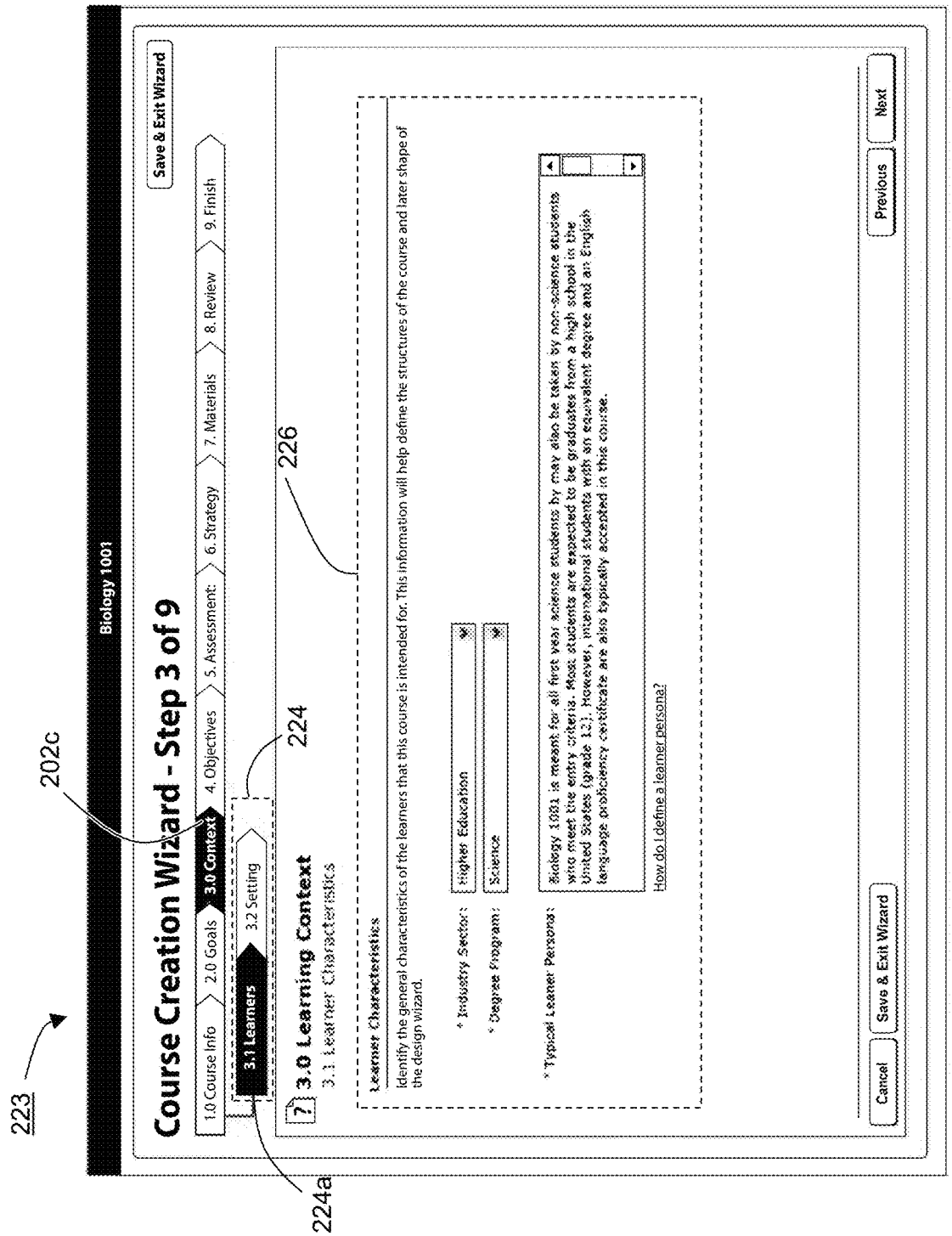
FIG. 25 is a screenshot of a learner characteristics page for the course design module of FIG. 19.

Next, the user may be presented with a learner characteristics page 223 as shown in FIG. 25 (with "learners" 224a highlighted as the active sub-components 224). This page 223 may allow the user to define the general characteristics of the participants in the course as presented in the content area 226, which may be used to modify subsequent course parameters that are presented to the user. For example, the course parameters for this course component could include prompting the user to identify elements such as industry sector (e.g. higher education, corporate learning, personal study, etc.), the type of degree offered (e.g. science, arts, etc.) as well as define a typical participant or learner persona.

Figure 26:
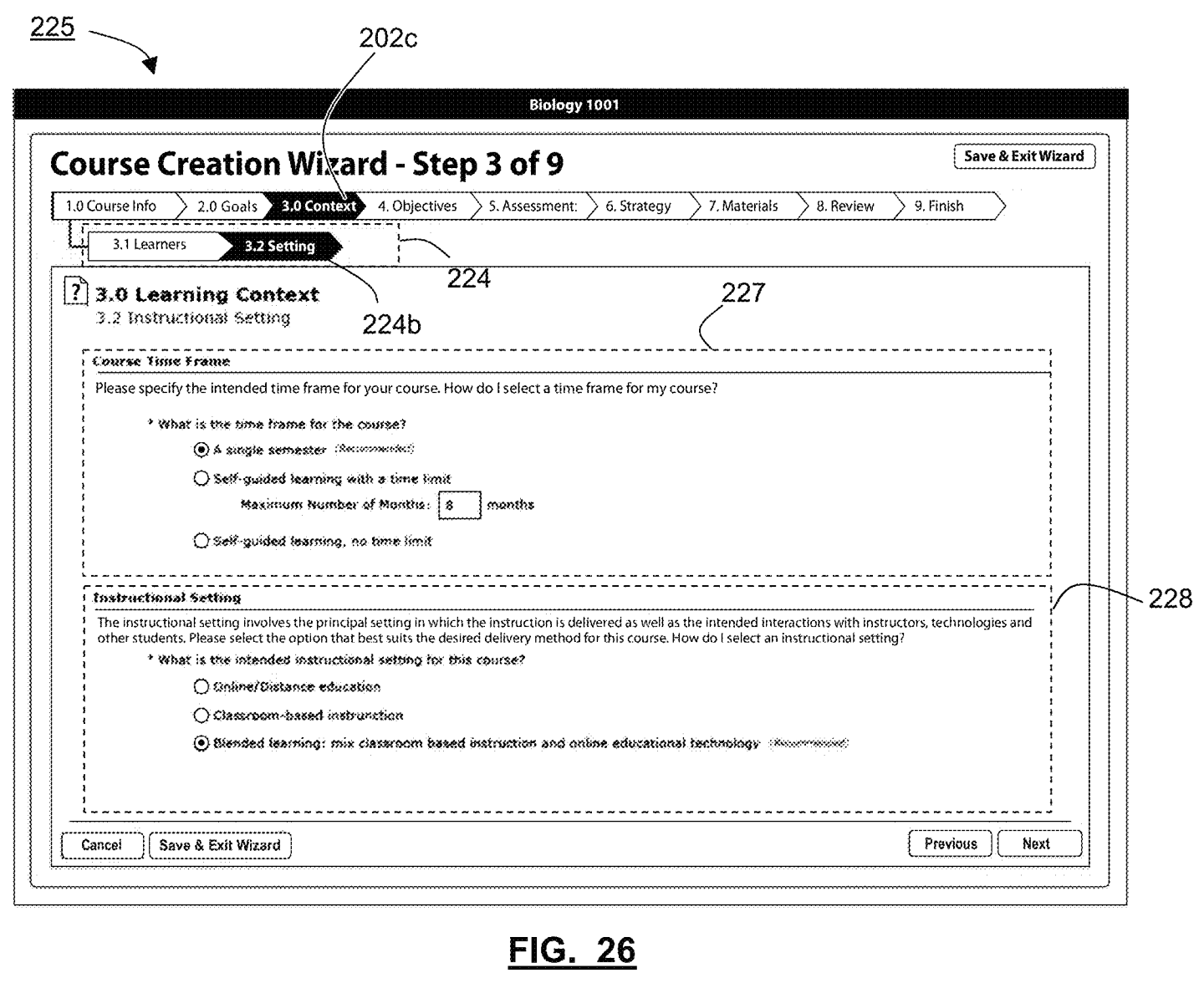

In FIG. 26, various elements of the learning context course component 202c may be further developed using an instructional setting page 225 (with "setting" highlighted as the active sub-component 224). For example, course parameters related to the course time frame may be presented in a first content area 227 (e.g. is this a single semester course, a self-guided study course with or without a time limit, etc.), while course parameters related to the instructional setting may be presented in a second content area 228 (e.g. is the course an online-only course, a classroom only course, or a blend).

Turning now to FIG. 27 a learning objectives page 229 for the course component "objectives" 202d can be presented. The user can use the objectives page 229 to add and/or remove learning objectives for the particular course, which can include performance skills, behavioural objectives, performance objects, knowledge development objectives, etc. For example, one objective could be to recognize and identify basic laboratory equipment. These course parameters could include natural language objects (e.g. text) and controls (e.g. add or remove buttons) presented in a first content area 230.

Figure 28:
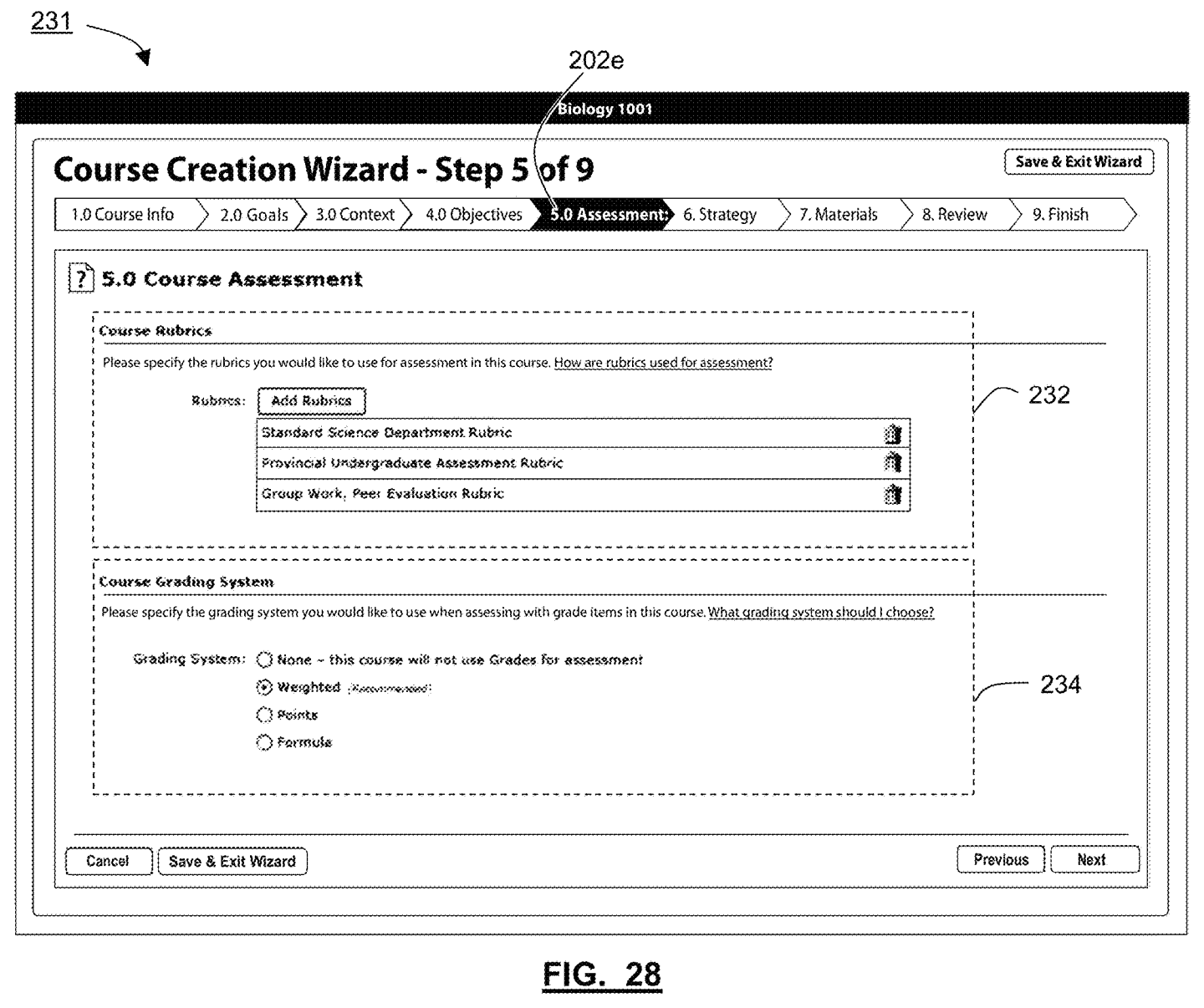

Once the learning objectives have been identified, a course assessment page 231 may be used to add assessments for the course, and (as shown in FIG. 28) for the course component "assessment" 202e.

The assessment course parameters could include course rubrics as shown in the first content area 232 (e.g. standard science department rubrics, provincial or state-wide rubrics) and selecting a grading system using a second content area 234 (e.g. weighted, points, formula, or no grading).

Figure 29:
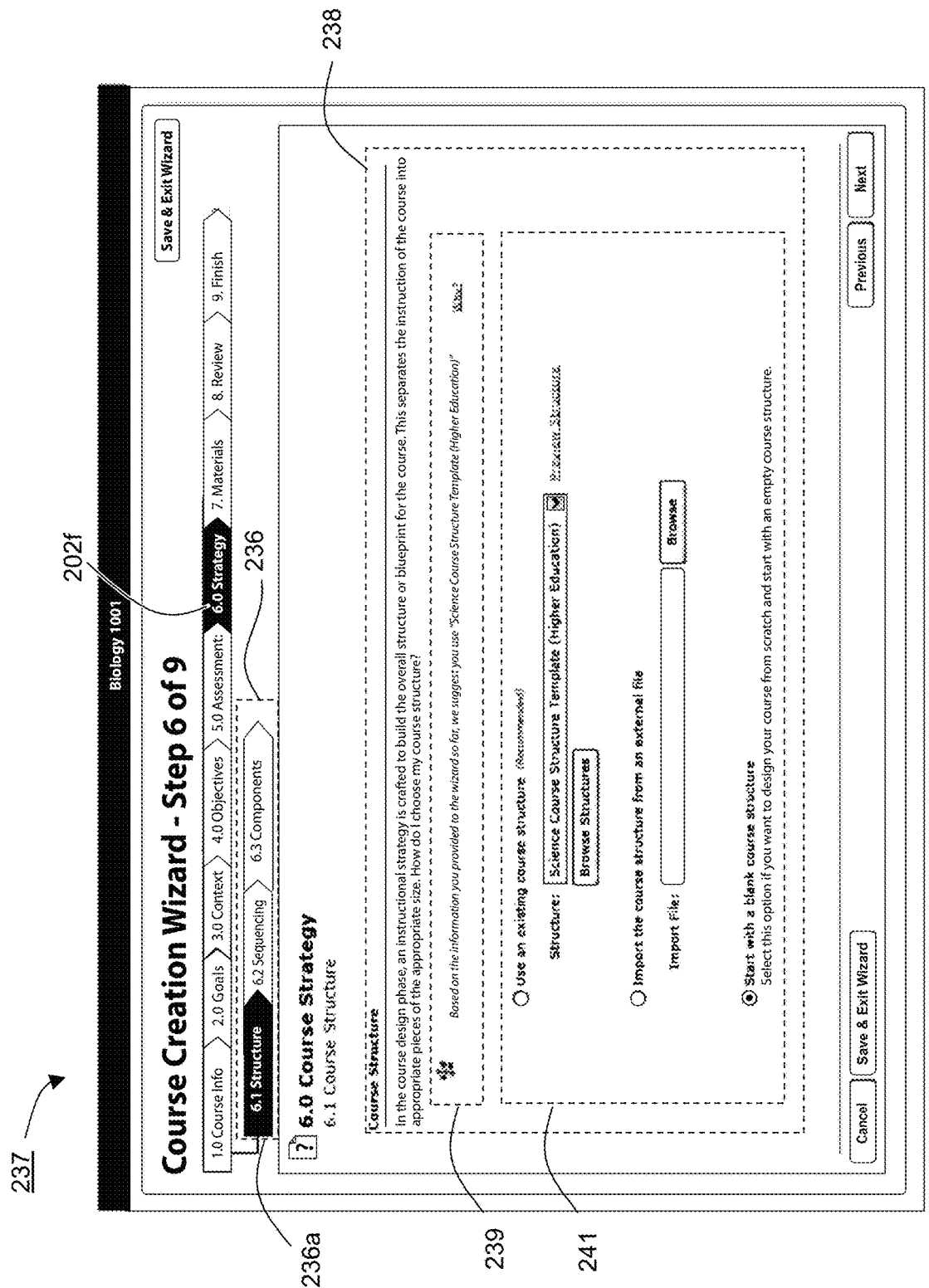
FIG. 29 is a screenshot of a course structure page for the course design module of FIG. 19.

The next steps in the course design module 200 could include pages covering a "strategy" 202f course component. For example, FIG. 29 shows a course structure page 237 where parameters related to the course structure can be displayed in a content area 238 (with "structure" 236a listed as the active sub-component 236). In some embodiments, the content area 238 may include a suggestion 239 to the user based on previously received user information. For example, the course design module 200 may suggest that the user select a "science" course structure, and may actually place this suggestion as the default entry in one of the controls 241. The user can then use the controls 241 to select this suggestion or make another selection.

FIG. 30 shows a course sequence page 243 for the "strategy" 202f course component, which allows the user to modify course parameters related to the "sequencing" 236b sub-component of the course. For example, the user can use control in the content area 240 to select a sequence based on timeline, subject matter, or competencies, as well as define course units.

Figure 31:
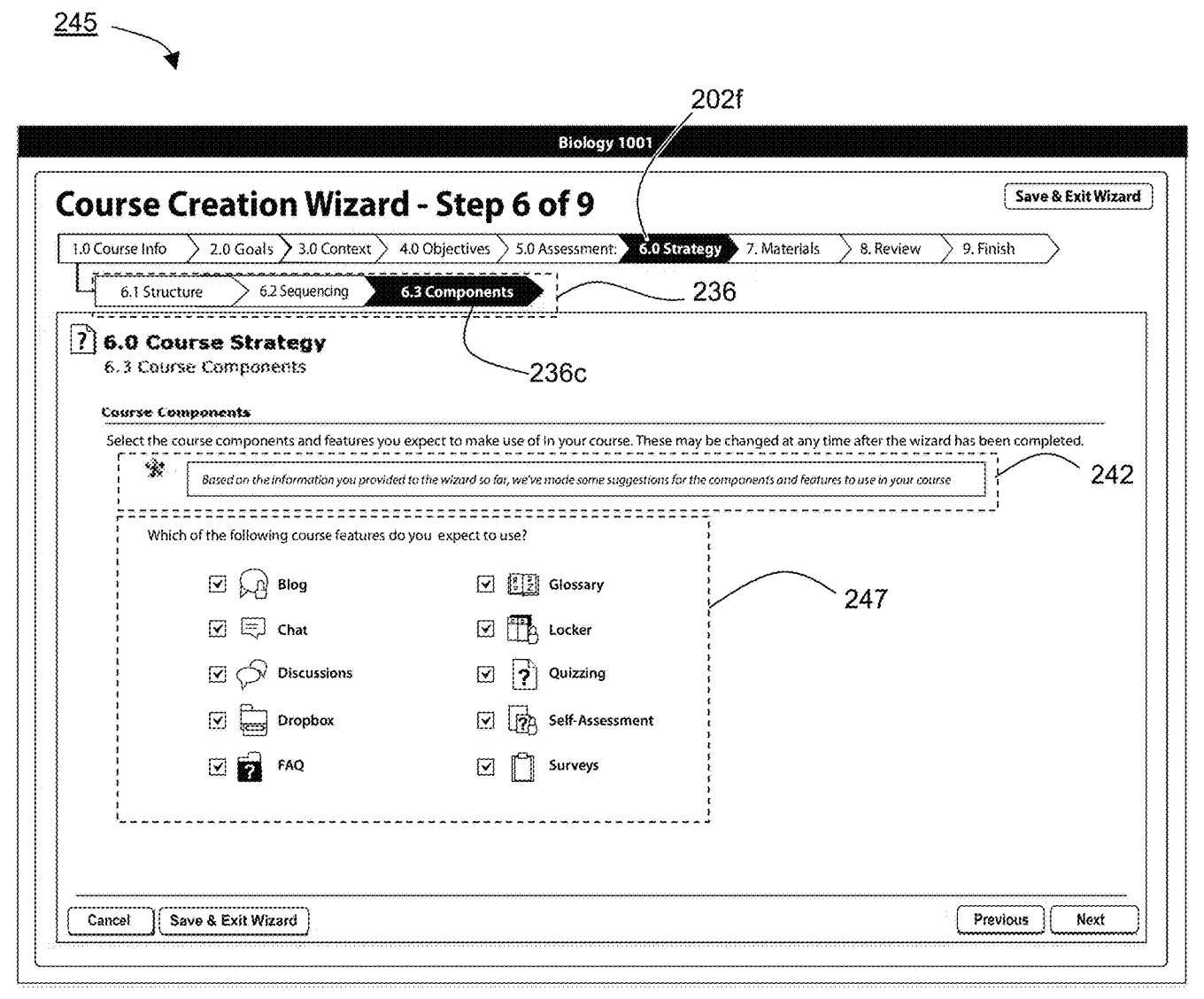

Furthermore, using a course components page 245 shown in FIG. 31, the user may be presented with suggestions 242 for educational components and features to be added to the course (e.g. one or more of a blog, discussion, dropbox, FAQ, etc.), and which may be presented in a content area 247 so that they may be selected or deselected by the user.

Figure 32:
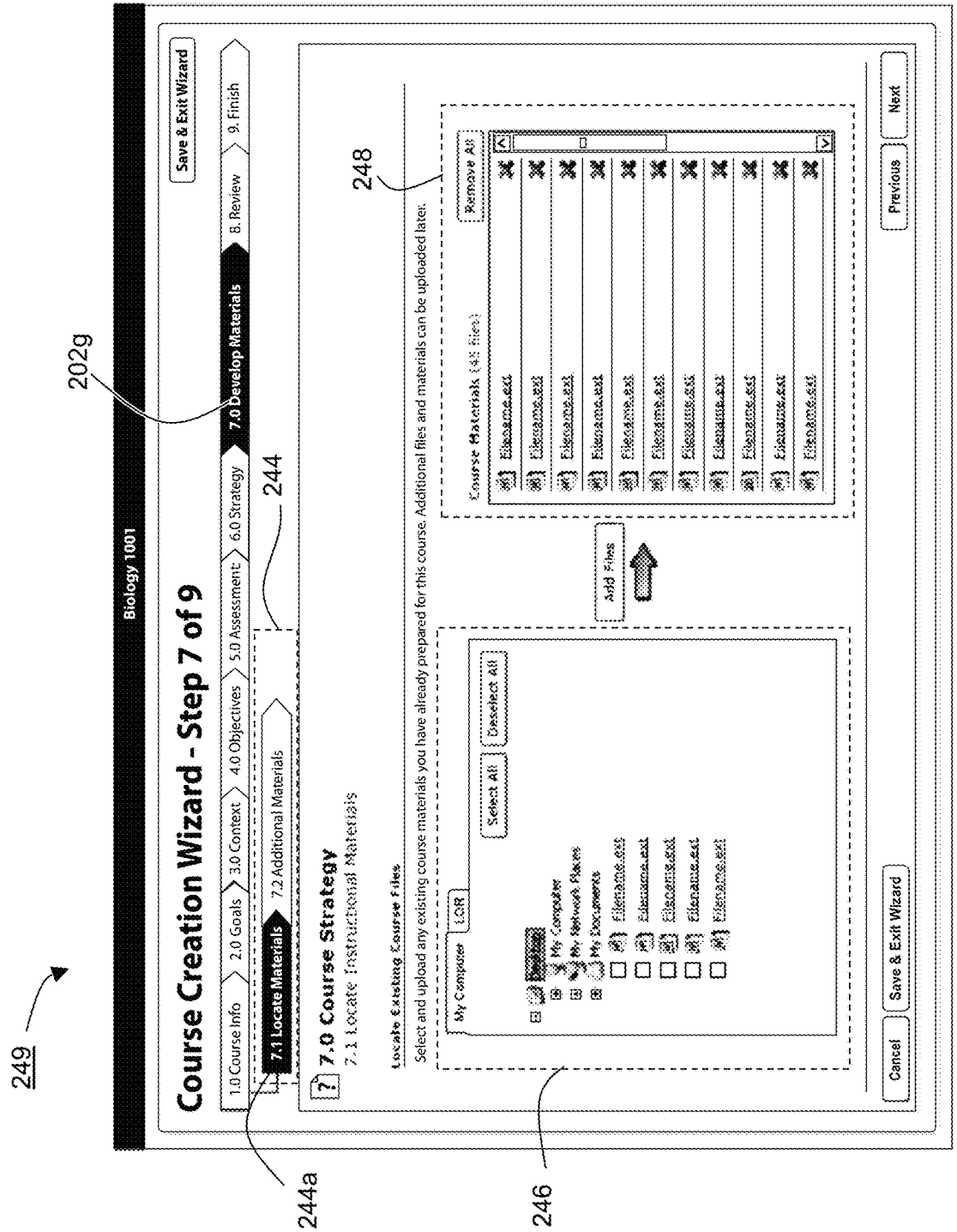
FIG. 32 is a screenshot of a locate materials page for the course design module of FIG. 19.

Turning now to FIG. 32, a locate materials page 249 for the course component "develop materials" 202g is shown (with "locate materials" 244a highlighted as the active sub-component 244). The locate materials page 249 will allow the user to input course materials (e.g. handouts, slides, audio recording, readings, etc.) that have been prepared for use with the course. The course materials may be selected by using a first content area 246 to browse a file system to locate files (which could be on a local drive or on a network). The user can then select particular files and add them to the course materials list as shown in the second content area 248.

Figure 33:
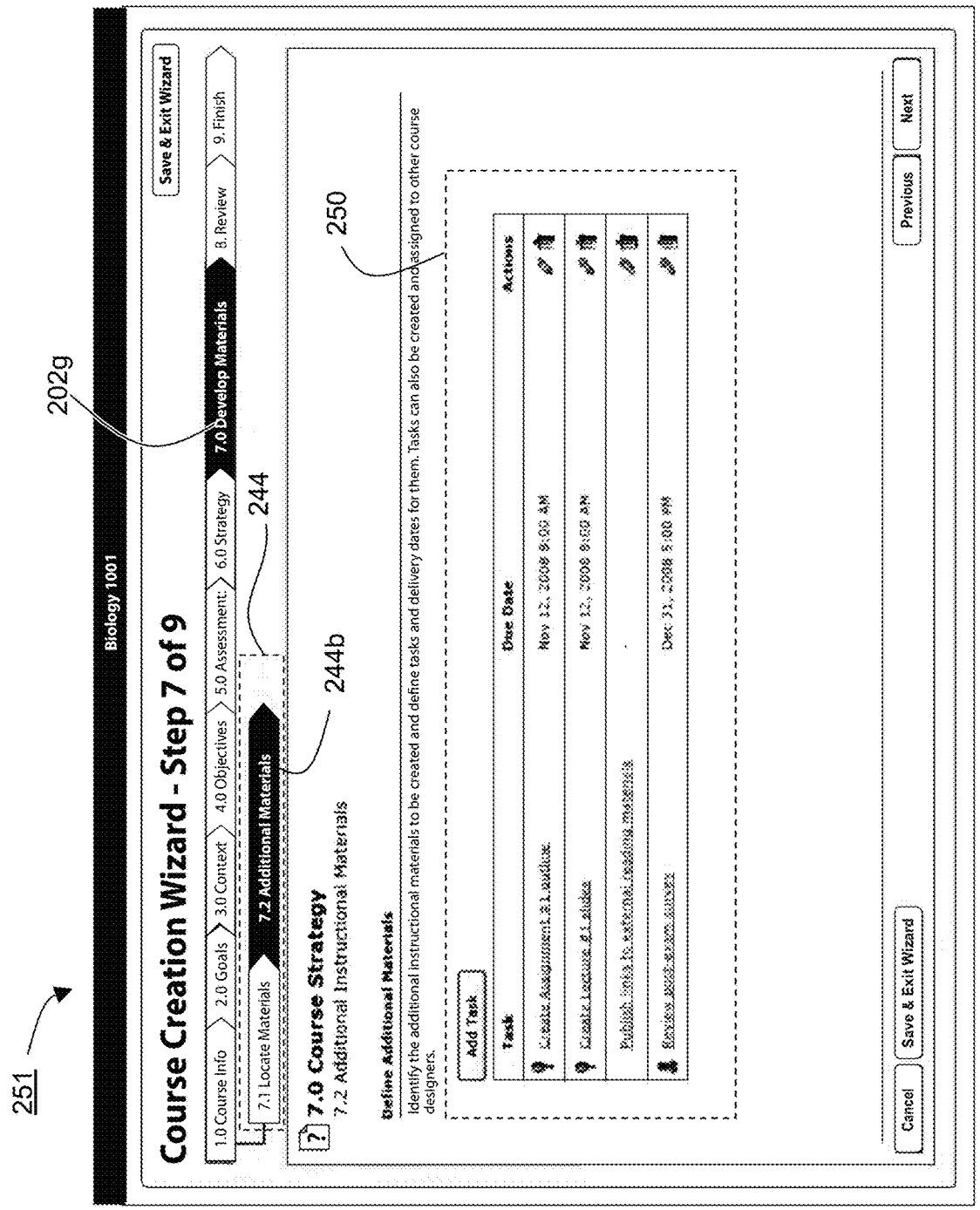
FIG. 33 is a screenshot of a define additional materials page for the course design module of FIG. 19.

In some embodiments, the next step will be to provide additional materials using a define additional materials page 251 as shown in FIG. 33 (with "additional materials" 244b identified as the active sub-component 244). For example, natural language objects and controls in a content area 250 can allow the user to identify additional instructional materials to be created, define tasks (e.g. create lecture #1 slides), and set deadlines for completion.

Figure 34:
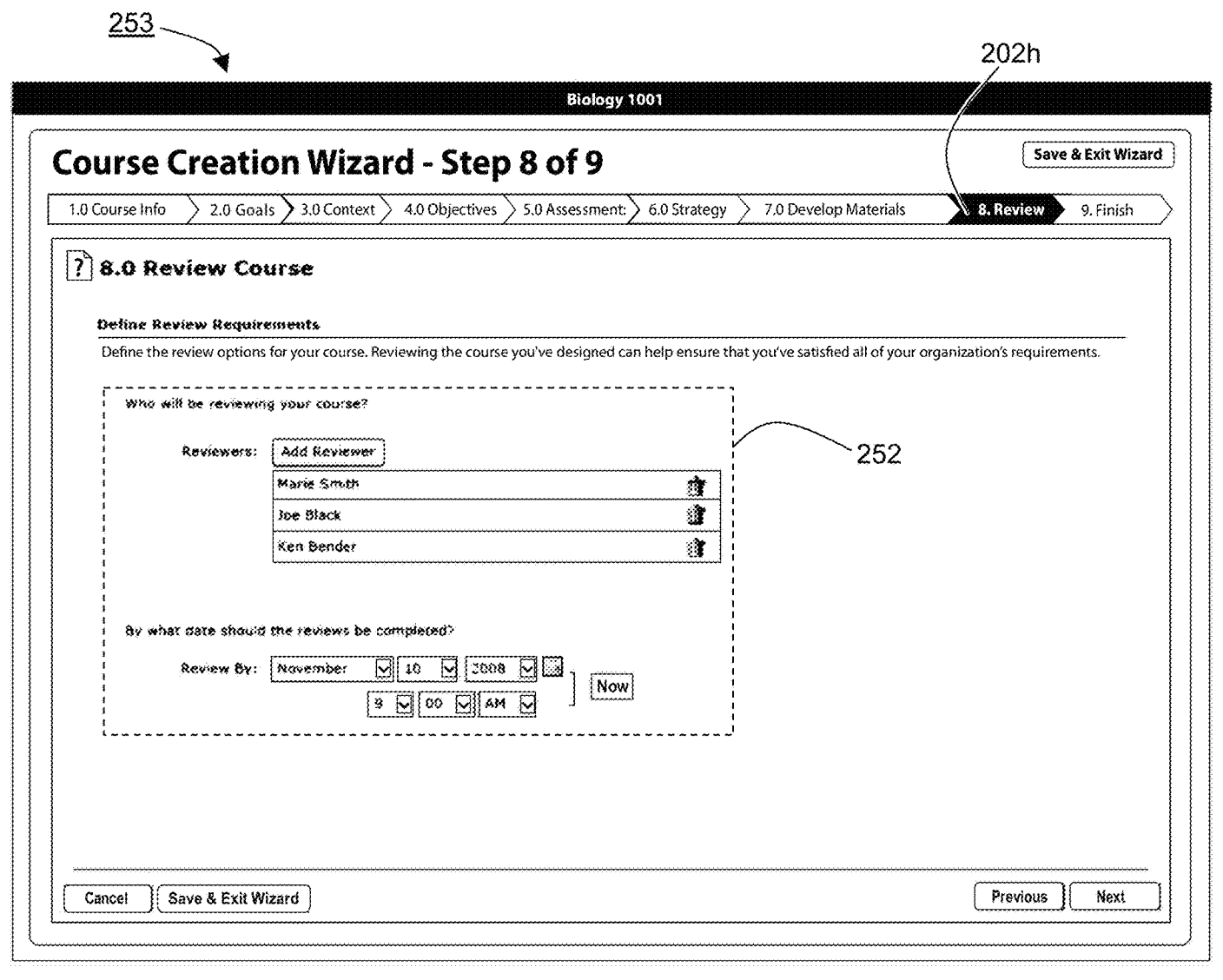

In some embodiments, the next step is to define course review components 202h, for example using a course review page 253 as shown in FIG. 34. Using this page 253, the user can add one or more users to review the course that is being created (e.g. using controls in a content area 252), which may be helpful in ensuring that the user creates a course that meets the requirements of the particular educational institution.

Figure 35:
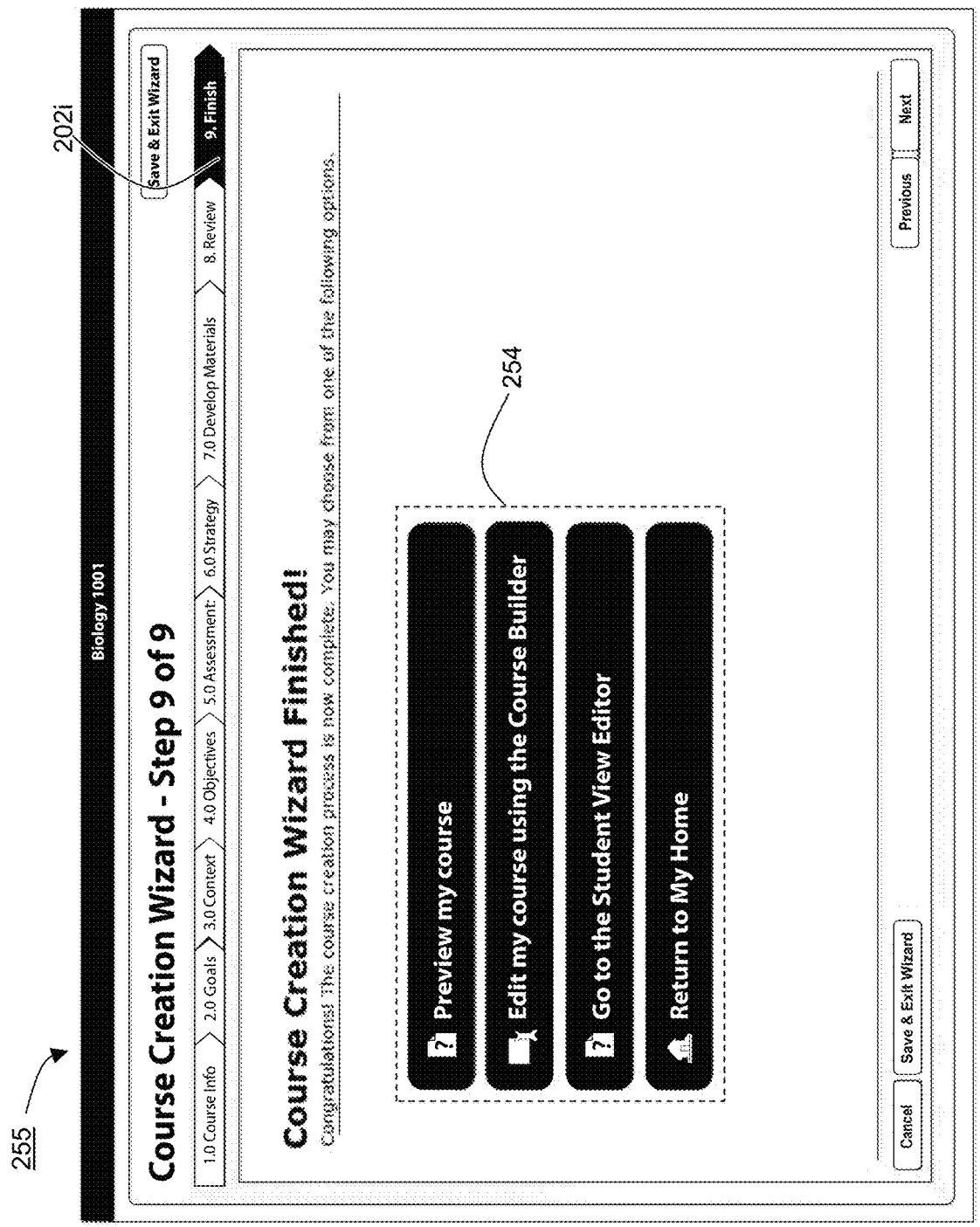
FIG. 35 is a screenshot of a completion page for the course design module of FIG. 19.

Turning now to FIG. 35, the user has completed the course design module 200 and is presented with a completion screen 255 (with "finish" listed as the active course component). Using controls in the content area 254, the user can then choose to take actions such as previewing the course, editing the course using the course design module 200 or another application, etc.

The course design module 200 can therefore generate a customized course framework that is based on the course parameters presented to the user and the inputs received from the user.

Figure 36:
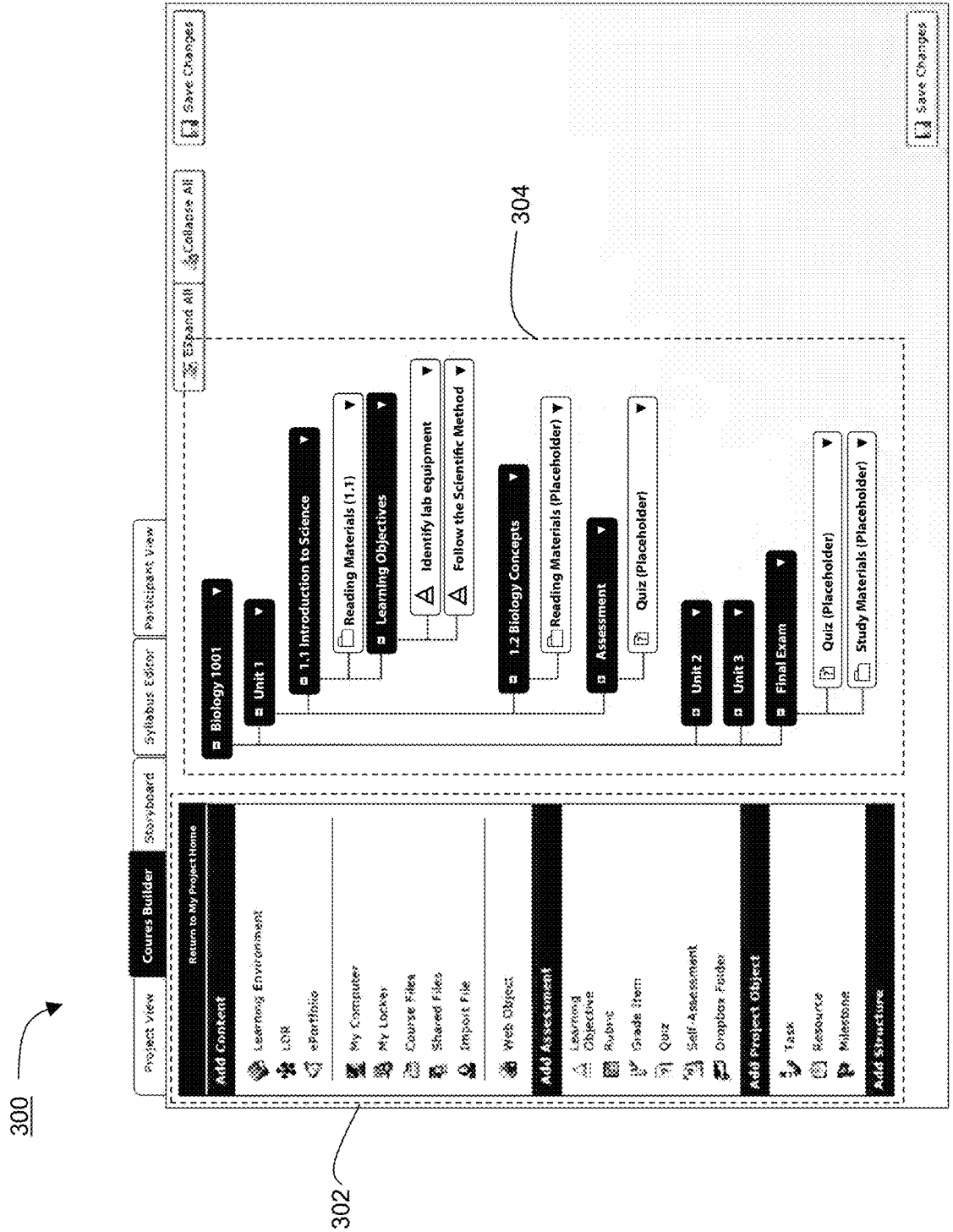
FIG. 36 is a screenshot of a course builder module for displaying course framework information according to one embodiment.

Turning now to FIG. 36, illustrated therein is a course builder module 300 for displaying customized course framework information 304 according to one embodiment. As the course builder module may include a menu area 302, which may allow one or more users to take various actions with respect to the customized course framework 304, such as add content (e.g. files, web objects, etc.), add assessment (e.g. learning objectives, rubrics, quizzes, etc.) and add project objects (e.g. tasks, resources, etc.).

As shown, the course framework 304 is generally presented as a tree structure, as will be described in detail below.

Figure 37:
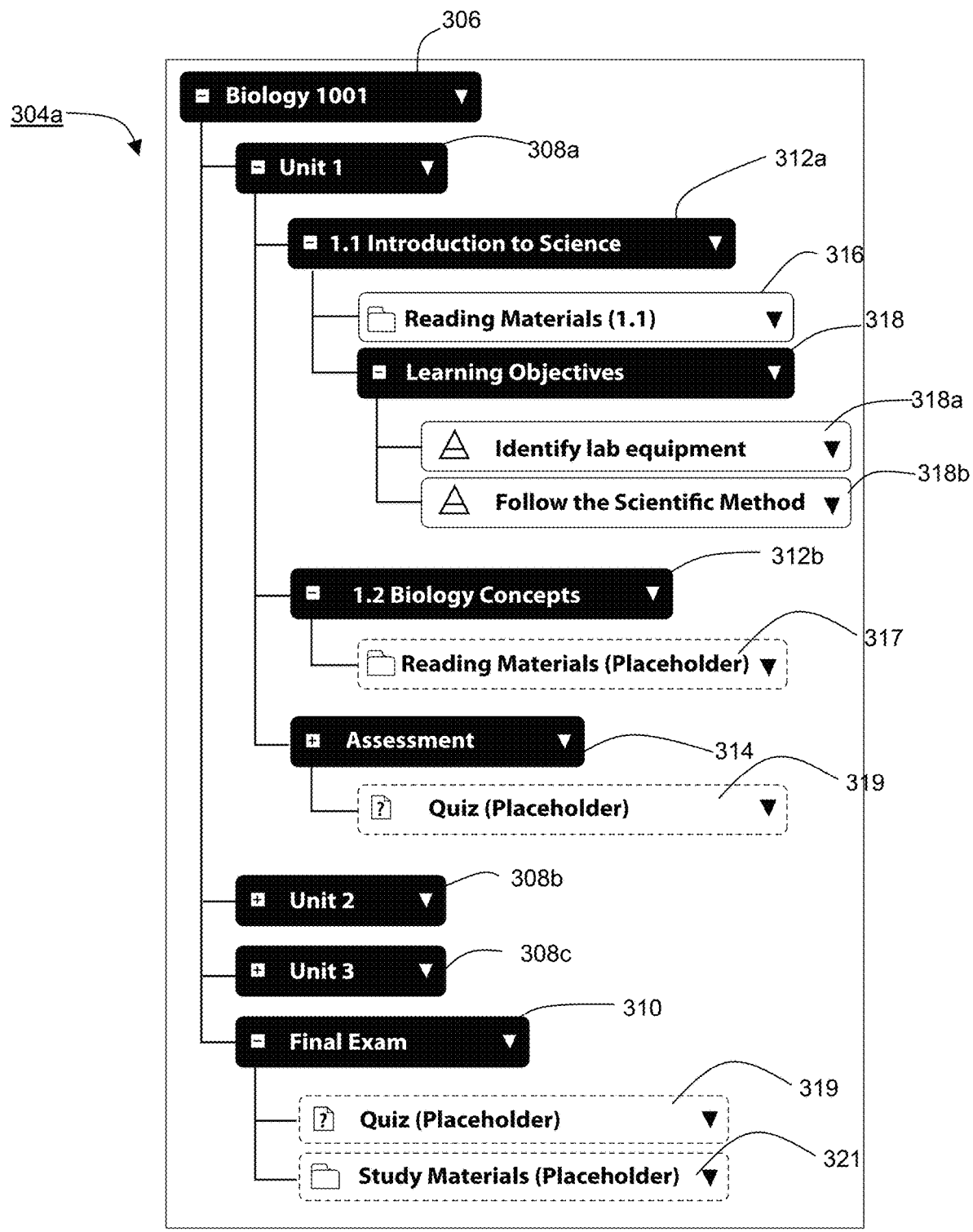
FIG. 37 is a detail view of a course framework from the course builder of FIG. 36 according to one embodiment.

FIG. 37 is a detail view of the course framework 304 according to one embodiment, labeled generally as 304a.

In this embodiment the course framework 304a includes a course title 306 (e.g. Biology 1001), a plurality of units 308a, 308b, 308c, and a final exam 310. Each unit 308a, 308b, 308c may include sub-elements. For example, the first unit includes two instructional elements 312a (labeled "introduction to science") and 312b (labeled "biology concepts), and an assessment 314.

The first instructional element 312a includes reading materials 316, and two learning objects 318, namely "identify lab equipment" 318a and "follow the scientific method" 318b.

The second instructional element 312b includes a placeholder for reading materials 317 (and which may be populated with actual reading material content at a later time).

The assessment 317 also includes a placeholder for a quiz 319.

The final exam 310 includes two placeholders for a quiz 319 and for study materials 321.

By presenting the customized course framework 304 in this manner, users can quickly grasp the overall structure of the course, which may be useful in organizing the course material and identifying materials that still need to be created. For example, in some embodiments, the placeholders can be populated with elements using the course builder 300, and/or one of the course design modules 100, 200 identified above.

Figure 38:
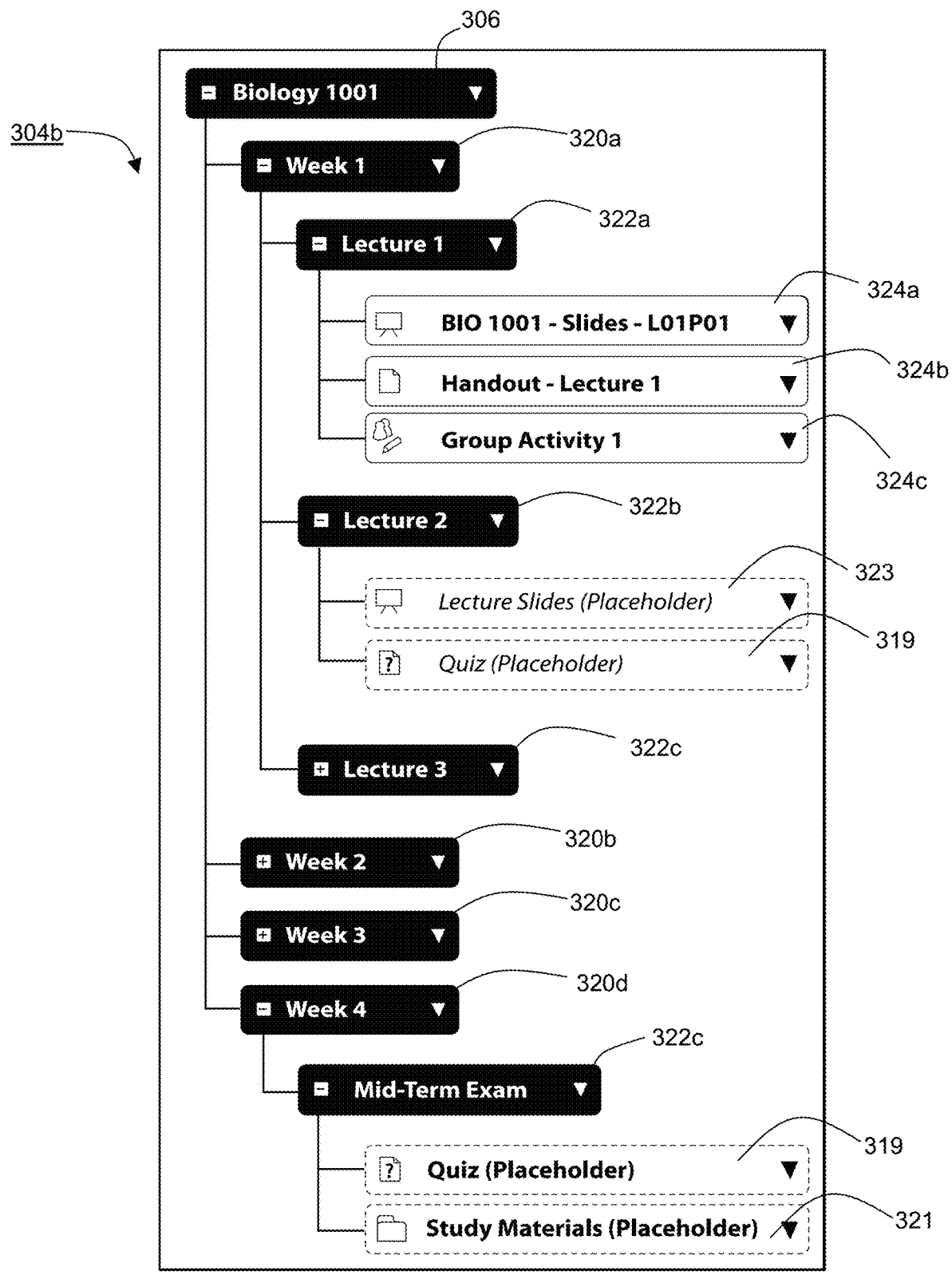
FIG. 38 is a detail view of a course framework from the course builder of FIG. 36 according to another embodiment.

The course framework 304 may also be presented in different ways to facilitate understanding of the course structure. For example, as shown in FIG. 38 the course framework 304 for the same course may be shown according to another embodiment labeled generally as 304b.

In this embodiment, the customized course framework 304b is presented in a generally chronological order, with four weeks 320a, 320b, 320c, 320d being identified. Each week 320a, 320b, 320c, 320d can have one or more educational elements associated therewith.

For example, the first week 320a includes a first lecture 322a and a second lecture 322b. The first lecture 322a includes slides 324a, a handout 324b and a group activity 324c associated therewith.

The second lecture 322b has placeholders for slides 323 and a quiz that have yet to be populated.

The fourth week 320d includes a mid-term exam 322c, which as shown includes placeholders for a quiz 319 and study materials 321 that have yet to be populated with content.

Figure 39:
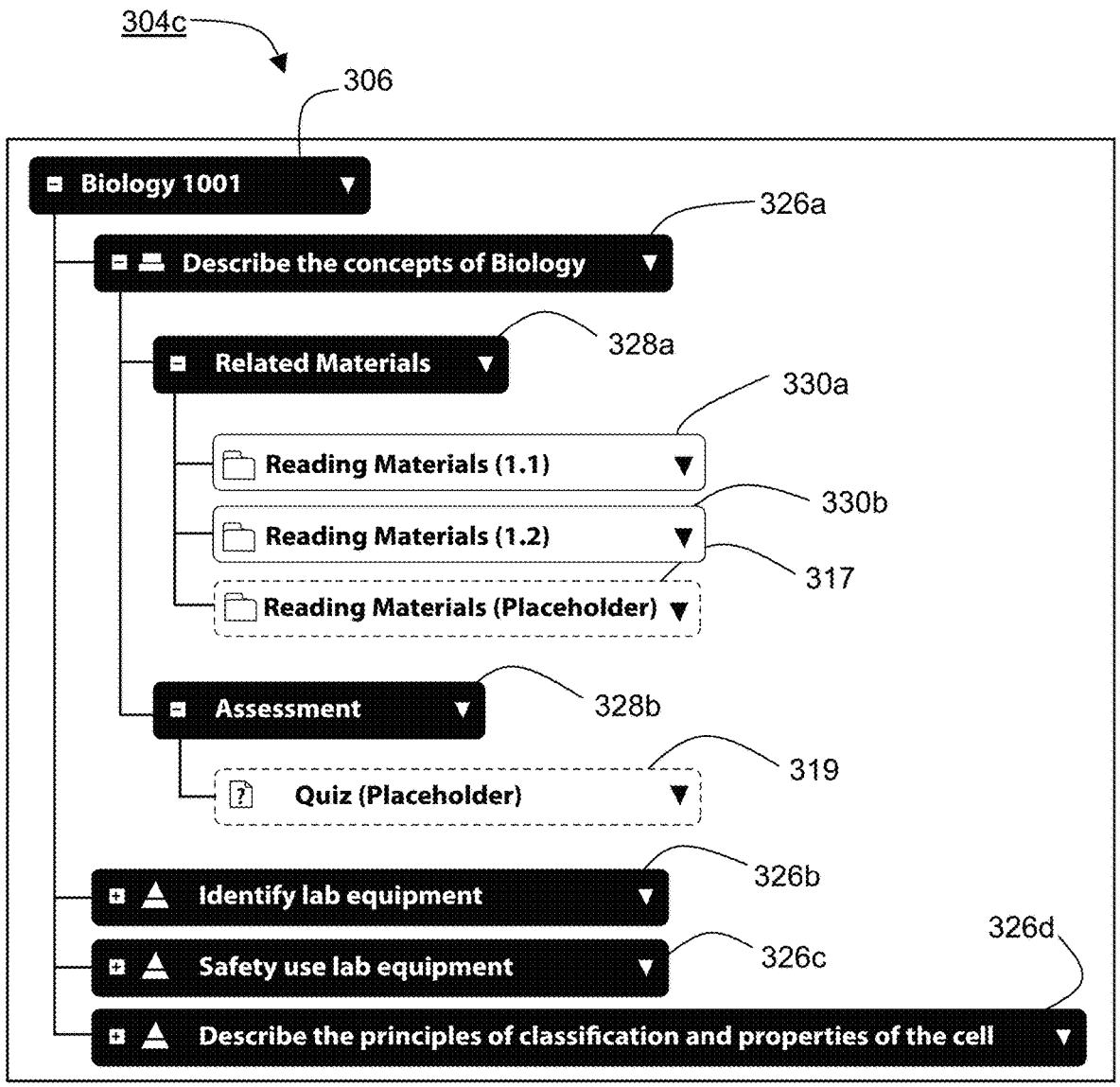
FIG. 39 is a detail view of a course framework from the course builder of FIG. 36 according to yet another embodiment.

FIG. 39 shows yet another view of the course framework 304 indicated generally as 304c according to yet another embodiment. In this embodiment, the course framework 304c is presented according to course objectives. For example, a first course objective 326a ("Describe the concepts of Biology"), a second course objective 326b ("Identify lab equipment"), a third course objective 326c ("Safely use the lab equipment"), and a fourth course objective 326d ("Describe the principles of classification and properties of the cell").

The first course objective 326a includes general reading materials 328a, and an assessment 328b. The general reading materials 328a include specific reading materials 330a, 330b (e.g. particular chapters in a text book) as well as a placeholder 317 for additional reading materials.

The assessment 328b includes a placeholder 319 for a quiz.

Generally, in some embodiments, each of the course components and/or course parameters may be selected to be presented to a user based on educational theory. In some embodiments, educational theory may include research literature, expert opinions, and/or various other materials related to the field of teaching and knowledge acquisition more generally.

In some embodiments, a user providing input to one or more course parameters may be presented by providing educational theory in an understandable format (e.g. natural language) at the point of decision by the user. As such, the user may consider selected relevant educational theories when making one or more decisions as to the selection of particular educational elements for the course.

While the above description provides examples of some embodiments, it will be appreciated that some features and/or functions of the described embodiments are susceptible to modification without departing from the spirit and principles of operation of the described embodiments. Accordingly, what has been described above has been intended to be illustrative of some embodiments of the invention and non-limiting and it will be understood by persons skilled in the art that other variants and modifications may be made without departing from the scope of the claims appended hereto.

The invention claimed is:

1. A system for providing guided instructional design, comprising:
   a) at least one processor; and
   b) at least one computer storage media in communication with the at least one processor, the at least one computer storage media configured to store information about at least one course;
   c) wherein, for each course, the at least one processor is configured to provide at least one course design module, the at least one course design module being configured to present at least one predetermined course component to a first user, the first user being responsible for providing the course, the at least one course component being configured to:
      i. present at least one course parameter to the first user, the at least one course parameter being related to at least one course competency, the at least one course competency being a goal for the course;
      ii. receive at least one first input from the first user in relation to the at least one course parameter;
      iii. generating at least one modified course parameter, the at least one modified course parameter being a list of course objectives, the list of course objectives suggesting certain course objectives to the first user based on previous user inputs and educational design elements;
      iv. receive at least one second input from the first user in relation to the at least one modified course parameter;
      v. present at least one activity to the first user; and
      vi. receive at least one third input from the first user in relation to the at least one activity, the at least one third input adding the at least one activity to at least one of the course objectives,
   wherein the at least one course design module is further configured to generate a customized course framework for that particular course based on the at least one first input, the at least one second input, the at least one third input and the at least one educational design element.

2. The system of claim 1, wherein at least one of the course parameters includes at least one natural language object.

3. The system of claim 2, wherein the at least one natural language object includes at least one predefined educational term.

4. The system of claim 2, wherein at least one of the course parameters includes at least one control associated with the at least one natural language object, each control for receiving one of the at least one first inputs from the user.

5. The system of claim 1, wherein the suggesting of the at least one modified course parameter to the first user includes suggesting at least one course structure element.

6. The system of claim 1, wherein the educational design element includes at least one element of educational theory.

7. The system of claim 1 further comprising at least one computing device in communication with the at least one processor, wherein the at least one processor is further configured to provide the at least one course design module to the first user on the at least one computing device and the at least one course design module is further configured to:
   a) receive at least one request from a second user in relation to a particular course, the second user being a consumer of the course content, and
   b) in response to the request, present at least part of the customized course framework for that course to the second user using the at least one computing devices.

8. The system of claim 1, wherein the at least one course competency includes a desired post-course competency.

9. The system of claim 1, wherein each of the course objectives of the list of course objectives is a narrowly defined goal that is associated with the at least one course competency.

10. The system of claim 9, wherein the at least one activity is associated with at least one of the course objectives.

11. The system of claim 1, wherein the processor is further configured to present at least one second course parameter, the at least one second course parameter being related to course information.

12. The system of claim 1, wherein the processor is further configured to present at least one second course parameter, the at least one second course parameter being related to at least one educational module.

13. The system of claim 12, wherein the at least one second course parameter is related to at least one assessment for the at least one educational module.

14. The system of claim 12, wherein the processor is further configured to receive an input in relation to the second course parameter, the input in relation to the second course parameter including educational materials associated with the at least one educational module.

15. The system of claim 12, wherein the educational materials include at least one data file.

16. The system of claim 15, wherein the at least one data file includes a media file.

17. The system of claim 1, wherein at least one of the course parameters and the modified course parameters includes predetermined natural language objects.

18. The system of claim 1 wherein at least one of the modified course parameters includes natural language objects selected based on the at least one first input.

19. The system of claim 1, wherein the at least one processor is further configured to present the customized course framework to the first user and allow the first user to edit the customized course framework.

20. The system according to claim 1, wherein at least one of the course parameters and modified course parameters is determined based on historical course information.

21. A tangible computer readable medium including computer executable instructions which, when executed on a computing device, cause at least one processor of the computing device to perform a method of providing guided instructional advice, the method comprising:
a) present at least one predetermined course component to a first user, the first user being responsible for providing the course; and
b) for at least one course component:
i. present at least one course parameter, the at least one course parameter being related to at least one course competency, the at least one course competency being a goal for the course;
ii. receive at least one first input from the first user in relation to the at least one course parameter;
iii. generating at least one modified course parameter, the at least one modified course parameter being a list of course objectives, the list of course objectives suggesting certain course objectives to the first user based on previous user inputs and educational design elements;
iv. receive at least one second input from the first user in relation to the at least one modified course parameter;
v. present at least one activity to the first user;
vi. receive at least one third input from the first user in relation to the at least one activity, the at least one third input adding the at least one activity to at least one of the course objectives; and
vii. generate a customized course framework for that particular course based on the at least one first input, the at least one second input, the at least one third input and the at least one educational design element.

22. The computer readable medium of claim 21, wherein the computer readable medium is non-transitory.

23. A method for providing guided instructional design, comprising:
a) providing at least one processor;
b) providing at least one computer storage media in communication with the at least one processor, the at least one computer storage media configured to store information about at least one course;
c) presenting at least one predetermined course component to a first user, the first user being responsible for providing the course, and
d) for the at least one course component:
i. presenting at least one course parameter, the at least one course parameter being related to at least one course competency, the at least one course competency being a goal for the course;
ii. receiving at least one first input from the first user in relation to the at least one course parameter;
iii. generating at least one modified course parameter, the at least one modified course parameter being a list of course objectives, the list of course objectives suggesting certain course objectives to the first user based on previous user inputs and educational design elements;
iv. receiving at least one second input from the first user in relation to the at least one modified course parameter
v. presenting at least one activity to the first user; and
vi. receiving at least one third input from the first user in relation to the at least one activity, the at least one third input adding the at least one activity to at least one of the course objectives,
wherein the at least one processor is further configured to generate a customized course framework for that particular course based on the at least one first input, the at least one second input, the at least one third input and the at least one educational design element.

* * * * *